US012374300B2

(12) United States Patent
Sang et al.

(10) Patent No.: US 12,374,300 B2
(45) Date of Patent: Jul. 29, 2025

(54) DISPLAY DEVICE

(71) Applicant: LG Display Co., Ltd., Seoul (KR)

(72) Inventors: Woo Kyu Sang, Paju-si (KR); Bo Gun Seo, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/763,448

(22) Filed: Jul. 3, 2024

(65) Prior Publication Data

US 2025/0118267 A1 Apr. 10, 2025

(30) Foreign Application Priority Data

Oct. 5, 2023 (KR) ........................ 10-2023-0132402

(51) Int. Cl.
*G09G 3/3291* (2016.01)
*G09G 3/3233* (2016.01)

(52) U.S. Cl.
CPC ......... *G09G 3/3291* (2013.01); *G09G 3/3233* (2013.01); *G09G 2300/0842* (2013.01); *G09G 2300/0861* (2013.01); *G09G 2310/0286* (2013.01); *G09G 2310/0289* (2013.01); *G09G 2310/08* (2013.01); *G09G 2320/0223* (2013.01)

(58) Field of Classification Search
CPC ........................... G09G 3/3233; G09G 3/3291
See application file for complete search history.

(56) References Cited

U.S. PATENT DOCUMENTS

| | | | | |
|---|---|---|---|---|
| 10,354,602 | B2 | 7/2019 | Hwang et al. | |
| 11,514,860 | B2 | 11/2022 | Pyun et al. | |
| 11,610,552 | B2 | 3/2023 | Sohn et al. | |
| 2018/0033381 | A1 | 2/2018 | Hwang et al. | |
| 2020/0273407 | A1 * | 8/2020 | Hu | G09G 3/3688 |
| 2022/0076636 | A1 | 3/2022 | Sohn et al. | |
| 2022/0084469 | A1 | 3/2022 | Pyun et al. | |
| 2023/0084383 | A1 | 3/2023 | Pyun et al. | |

FOREIGN PATENT DOCUMENTS

| | | | | |
|---|---|---|---|---|
| CN | 111833811 | A * | 10/2020 | G09G 3/3225 |
| KR | 10-2018-0014406 | A | 2/2018 | |
| KR | 10-2022-0033617 | A | 3/2022 | |
| KR | 10-2022-0037043 | A | 3/2022 | |

* cited by examiner

*Primary Examiner* — Sardis F Azongha
(74) *Attorney, Agent, or Firm* — Fenwick & West LLP

(57) ABSTRACT

The present disclosure relates to a display device. The display panel of the display device includes at least a first block, a second block, a third block, and a fourth block from the left. A data driver includes a first drive IC disposed to be biased to the left end of the display panel within the first block of the display panel; and a second drive IC disposed to be biased to the right end of the display panel within the fourth block of the display panel.

19 Claims, 29 Drawing Sheets

DISPLAY DEVICE

CROSS-REFERENCE TO RELATED APPLICATION

This application claims priority to and the benefit of Republic of Korea Patent Application No. 10-2023-0132402, filed on Oct. 5, 2023, which is incorporated by reference in its entirety.

BACKGROUND

Field

The present disclosure relates to a display device.

Description of Related Art

A variety of flat panel displays are known, including electroluminescence displays (ELD) such as liquid crystal displays (LCD) and organic light-emitting diode (OLED) displays, field emission displays (FED), plasma display panels (PDP), and electrophoresis displays (EPD).

A display device includes a display panel having pixels arranged to display an input image, and a display panel driving circuit that writes data to the pixels of the display panel. The display panel driving circuit includes a data driving circuit that supplies a data voltage to data lines of the display panel, and a gate driving circuit that supplies a gate signal to gate lines of the display panel.

The delay time of the data signal and the delay time of the gate signal may be different depending on the position of the display panel. This may cause the pixel to be charged with different the amount of voltage depending on the position of the pixel on the display panel.

SUMMARY

The present disclosure has been made in an effort to address aforementioned necessities and/or drawbacks.

The present disclosure provides a display device that is capable of uniformly controlling the amount of voltage charging of pixels over the entire display area of a display panel.

The problem to be solved by the present disclosure is not limited to those mentioned above, and other problems not mentioned will be clearly understood by those skilled in the art from the following description.

A display apparatus according to one embodiment of the present disclosure includes a display panel including a plurality of gate lines disposed along a first direction, a plurality of data lines disposed along a second direction, and a plurality of pixel circuits; a data driver configured to supply a data voltage to the data lines; and a gate driver configured to supply a pulse of a scan signal to the gate lines. When the display panel is equally divided into a plurality of blocks in the first direction, the display panel includes at least a first block, a second block, a third block, and a fourth block from the left. The data driver includes a first drive IC disposed to be biased toward a left end of the display panel within the first block of the display panel; and a second drive IC disposed to be biased toward a right end of the display panel within the fourth block of the display panel.

The first drive IC may be connected to data lines disposed in the first and second blocks through a plurality of link lines. The second drive IC may be connected to data lines disposed in the third and fourth blocks through a plurality of other link lines.

The length of a link line connected to a right channel that is spaced from the center of the first drive IC may be longer than the length of a link line connected to a center channel of the first drive IC. The length of a link line connected to the rightmost channel of the first drive IC may be longer than the length of a link line connected to the leftmost channel of the first drive IC. The length of a link line connected to a left channel that spaced from the center of the second drive IC may be longer than the length of a link line connected to the center channel of the second drive IC. The length of a link line connected to the leftmost channel of the second drive IC may be longer than the length of a link line connected to the rightmost channel of the second drive IC.

When viewed from the first direction, the resistance of the link lines may increase as the link lines are from both edges of the display panel toward the center of the display panel.

The display device may further include a level shifter configured to supply a clock to the gate driver; and a plurality of clock wires disposed along the second direction of the display panel and connected to the gate driver.

Compared to the phase of the clock input to the gate driver at a first position of the clock wire located at a first distance from a clock input port to which the clock is applied, the phase of the clock input to the gate driver at a second position of the clock wire located at a second distance from the clock input port may be shifted further forward. The second distance may be greater than the first distance.

One period of the clock may be less than one period of a previous clock at the time when the phase of the clock is shifted forward.

The pixel circuit may include a transistor configured to be turned on in response to a gate-on voltage of the scan signal, and turned off in response to a gate-off voltage of the scan signal, and at the time when the phase of the clock is shifted forward, the interval of the gate-off voltage is shorter than the interval of the gate-off voltage within one period of the previous clock.

Each of the first and second drive ICs may output the data voltage in response to an output enable signal. A delay time of the output enable signal may become longer as the distance from the first and second drive ICs increases.

When the delay time of the output enable signal becomes longer than before, a pulse width of the output enable signal may increase.

A display apparatus according to another embodiment of the present disclosure, a display device may include a display panel including a plurality of gate lines disposed along a first direction, a plurality of data lines disposed along a second direction, and a plurality of pixel circuits; a data driver configured to supply a data voltage to the data lines; and a gate driver configured to supply a pulse of a gate signal to the gate lines. When the display panel is equally divided into a plurality of blocks in the first direction, the display panel includes at least a first block, a second block, a third block, and a fourth block from the left. The data driver includes a first drive IC disposed to be biased to the left end of the display panel within the first block of the display panel; a second drive IC disposed to be biased to the left of the display panel within the second block of the display panel; a third drive IC disposed to be biased to the right of the display panel within the third block of the display panel; and a fourth drive IC disposed to be biased toward the right end of the display panel within the fourth block of the display panel.

According to the present disclosure, it is possible to realize a display device which is advantageous in terms of high efficiency, high brightness, and long lifespan, and which is capable of improving power consumption.

According to the present disclosure, it is possible to reduce the margin time between the data voltage and the scan pulse by connecting the drive ICs to the display panel such that the drive ICs are disposed to be biased toward the left and right sides of the display panel.

According to the present disclosure, it is possible to further reduce the margin time between the data voltage and the scan pulse by shifting the phase of the clock forward at a position where the clock input to the gate driver has a large delay time, or by delaying the data voltage to match the delay time of the clock and the scan pulses.

According to the present disclosure, it is possible to improve the amount of charging of the data voltage over the entire display area of the display panel and to improve the time to sample the threshold voltage of the driving element.

The effects of the present disclosure are not limited to the above-mentioned effects, and other effects that are not mentioned will be apparently understood by those skilled in the art from the following description and the appended claims.

BRIEF DESCRIPTION OF THE DRAWINGS

The above and other objects, features, and advantages of the present disclosure will become more apparent to those of ordinary skill in the art by describing exemplary embodiments thereof in detail with reference to the attached drawings, in which.

DETAILED DESCRIPTION

Figure 1:
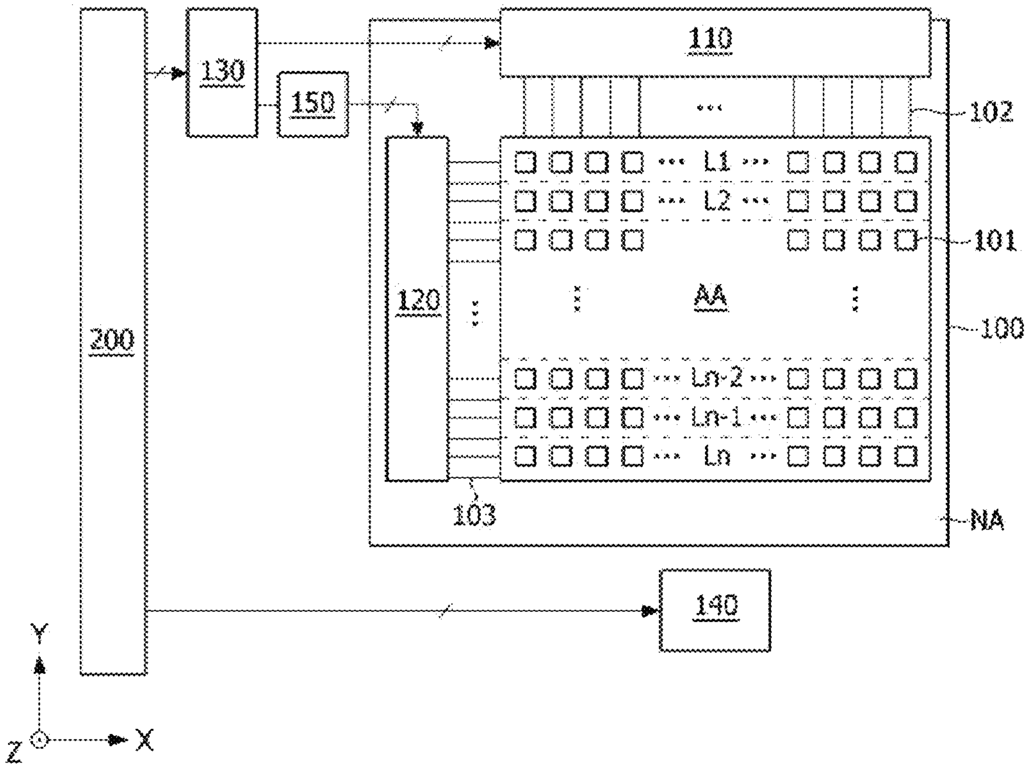
FIG. 1 is a block diagram illustrating a display device according to one embodiment of the present disclosure.

The advantages and features of the present disclosure and methods for accomplishing the same will be more clearly understood from embodiments described below with reference to the accompanying drawings. However, the present disclosure is not limited to the following embodiments but may be implemented in various different forms. Rather, the present embodiments will make the disclosure of the present disclosure complete and allow those skilled in the art to completely comprehend the scope of the present disclosure. The present disclosure is only defined within the scope of the accompanying claims.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present specification. Further, in describing the present disclosure, detailed descriptions of known related technologies may be omitted to avoid unnecessarily obscuring the subject matter of the present disclosure.

The terms such as “comprising,” “including,” “having,” and “comprising” used herein are generally intended to allow other components to be added unless the terms are used with the term “only.” Any references to singular may include plural unless expressly stated otherwise.

Components are interpreted to include an ordinary error range even if not expressly stated.

When a positional or interconnected relationship is described between two components, such as “on top of,”

"above," "below," "next to," "connect or couple with," "crossing," "intersecting," or the like, one or more other components may be interposed between them, unless "immediately" or "directly" is used.

When a temporal antecedent relationship is described, such as "after", "following", "next to", "before", or the like, it may not be continuous on a time base unless "immediately" or "directly" is used.

The terms "first," "second," and the like may be used to distinguish elements from each other, but the functions or structures of the components are not limited by ordinal numbers or component names in front of the components.

The following embodiments can be partially or entirely bonded to or combined with each other and can be linked and operated in technically various ways. The embodiments can be carried out independently of or in association with each other.

The pixel circuit and the gate drive circuit of the display device may include a plurality of transistors. The transistor may be implemented as a thin film transistor (TFT). The transistors may be implemented as an oxide thin film transistor (TFT) including an oxide semiconductor, a low temperature poly silicon TFT (LTPS TFT) including a low temperature poly silicon, and the like.

A transistor is a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the case of an n-channel transistor, since carriers are electrons, a source voltage is a voltage lower than a drain voltage such that electrons may flow from a source to a drain. The n-channel transistor has a direction of a current flowing from the drain to the source. In the case of a p-channel transistor (p-channel metal-oxide semiconductor (PMOS)), since carriers are holes, a source voltage is higher than a drain voltage such that holes may flow from a source to a drain. In the p-channel transistor, since holes flow from the source to the drain, current flows from the source to the drain. It should be noted that a source and a drain of a transistor are not fixed. For example, a source and a drain may be changed according to an applied voltage. Therefore, the disclosure is not limited to a source and a drain of a transistor. In the following description, a source and a drain of a transistor will be referred to as a first electrode and a second electrode.

A gate signal swings between a gate-on voltage and a gate-off voltage. A transistor is turned on in response to a gate-on voltage and is turned off in response to a gate-off voltage. In the case of an n-channel transistor, the gate-on voltage may be a gate high voltage VGH, and the gate-off voltage may be a gate low voltage VGL. In the case of a p-channel transistor, the gate-on voltage may be the gate low voltage VGL, and the gate-off voltage may be the gate high voltage VGH.

Hereinafter, various embodiments of the present disclosure will be described in detail with reference to the accompanying drawings.

Figure 2A:
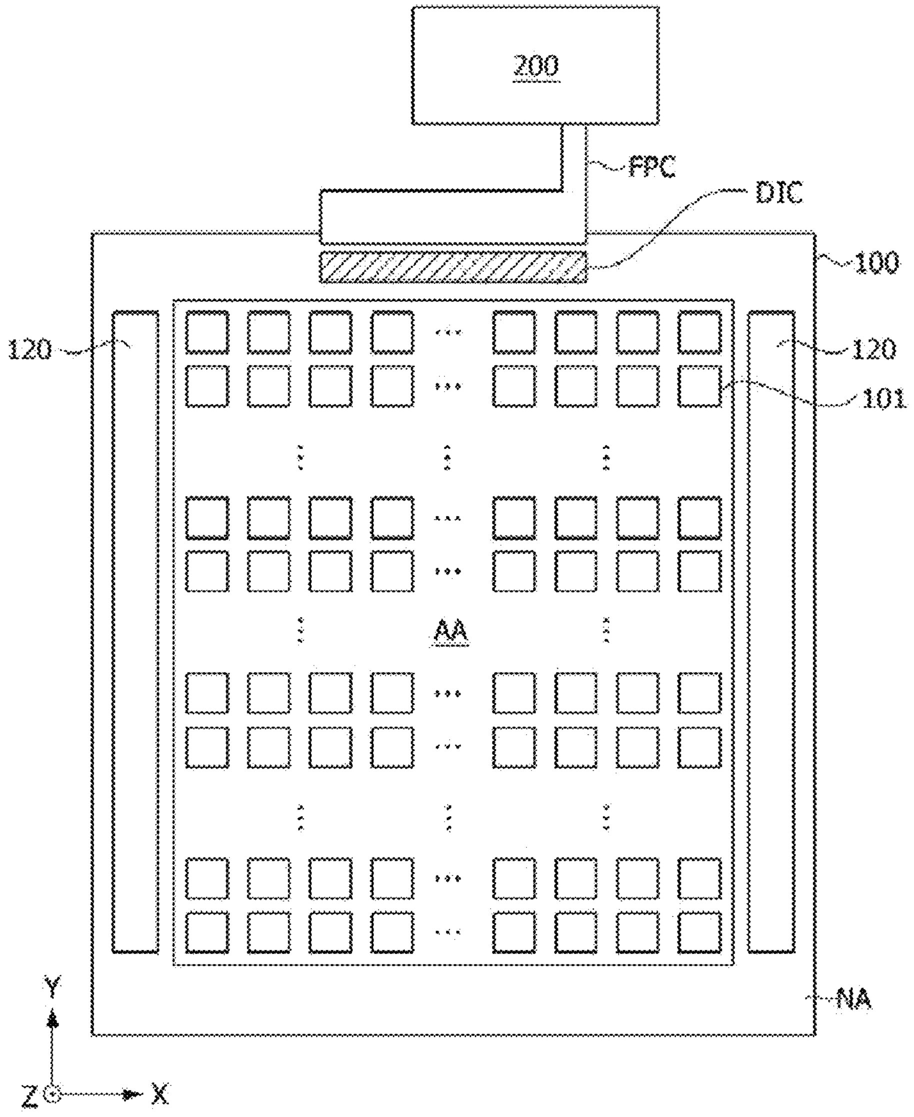
FIGS. 2A and 2B are diagrams illustrating other examples of the display device according to one embodiment of the present disclosure.
Figure 2B:
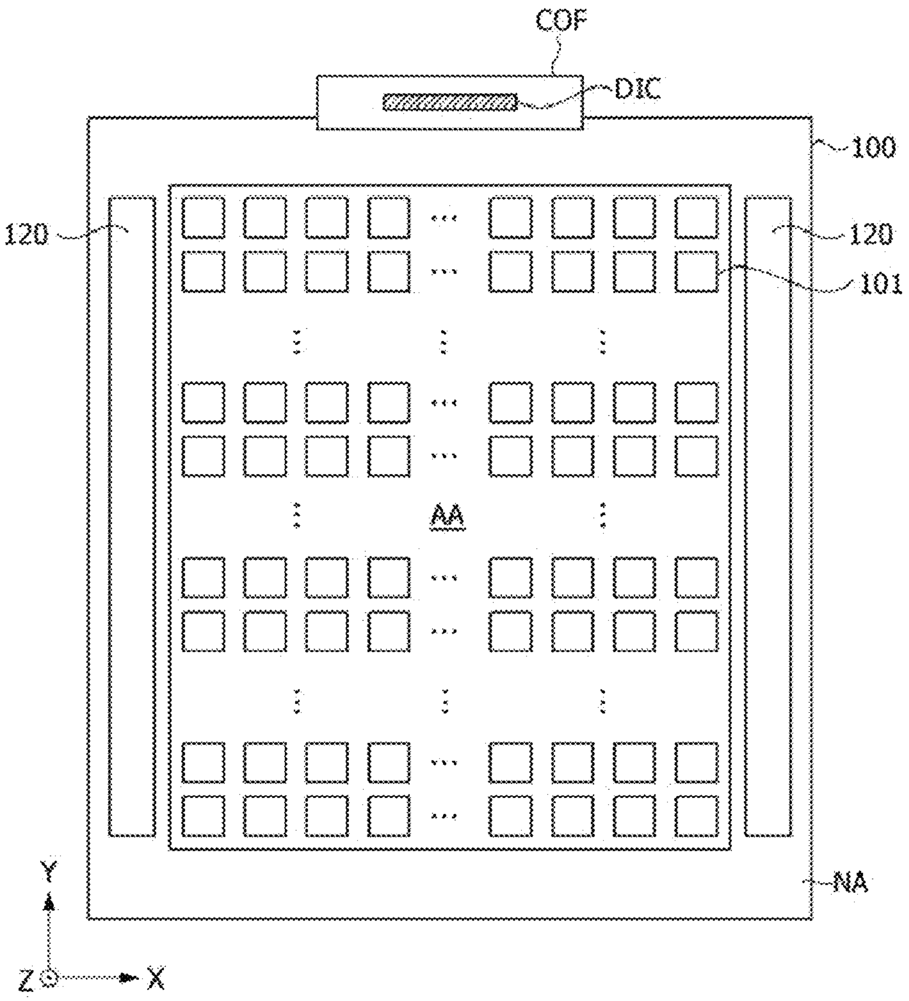

FIG. 1 is a block diagram illustrating a display device according to one embodiment of the present disclosure. FIGS. 2A and 2B are diagrams illustrating other examples of the display device according to one embodiment of the present disclosure.

Referring to FIGS. 1 to 2B, a display device according to an embodiment of the present disclosure includes a display panel 100, a display panel driving circuit for writing pixel data to pixels 101 of the display panel 100, and a power supply 140 for generating power necessary for driving the pixels 101 and the display panel driving circuit.

A substrate of the display panel 100 may be, but is not limited to, a plastic substrate, a thin glass substrate, or a metal substrate. The display panel 100 may be, but is not limited to, a rectangular shaped panel having a length in the X-axis direction (or the first direction), a width in the Y-axis direction (or the second direction), and a thickness in the Z-axis direction (or the third direction). For example, at least a portion of the display panel 100 may have a curved perimeter.

The display panel 100 may be implemented with a non-transmissive display panel or a transmissive display panel. The transmissive display panel may be applied to a transparent display device in which an image is displayed on a screen and an actual object in the background is visible. The display panel 100 may be made as a flexible display panel. Additionally, the display panel 100 may be made of a stretchable panel that may be stretched.

A display area AA of the display panel 100 includes a pixel array for displaying an input image thereon. The pixel array includes a plurality of data lines 102, a plurality of gate lines 103 intersecting the data lines 102, and the pixels 101 arranged in a matrix form. The display panel 100 may further include power lines commonly connected to the pixels 101. The power lines are commonly connected to pixel circuits and supply a constant voltage necessary for driving the pixels 101 to the pixels. The power lines may be implemented as long stripes of wirings along either the first or second direction, or as mesh wirings where the wirings in the first direction and the wirings in the second direction are electrically connected. The power lines may further include a VGL line and a VGH line connected to the gate driver 120. A gate low voltage may be applied to the VGL line, and a gate high voltage may be applied to the VGH line.

Each of the pixels 101 may be divided into a red sub-pixel, a green sub-pixel, and a blue sub-pixel for color implementation. Each of the pixels may further include a white sub-pixel. Each sub-pixel includes a pixel circuit for driving a light-emitting element. Each of the pixel circuits is connected to the data lines, the gate lines, and the power lines. Hereinafter, "pixel" may be understood as having the same meaning as "sub-pixel."

The pixels may be arranged in the form of real color pixels and pentile pixels. A pentile pixel may realize a higher resolution than the real color pixel by driving two sub-pixels having different colors as one pixel 101 by using a preset pixel rendering algorithm. A pixel rendering algorithm may compensate for inadequate color representation in each pixel with the color of light emitted from its adjacent pixel.

The pixel array includes a plurality of pixel lines L1 to Ln. Each of the pixel lines L1 to Ln includes one line of pixels arranged along the line direction (X-axis direction) in the pixel array of the display panel 100. The pixels arranged in one pixel line share the gate lines 103. The sub-pixels arranged in the column direction Y along the data line direction share the same data line 102. One horizontal period is a time obtained by dividing one frame period by the total number of pixel lines L1 to Ln.

The power supply 140 generates constant voltages (or direct current (DC) voltages) required for driving the pixel array and the display panel driving circuit of the display panel 100 by using a DC-DC converter. The DC-DC converter may include a charge pump, a regulator, a buck converter, a boost converter, and the like. The power supply 140 may adjust the level of the DC input voltage applied from a host system 200 to output a gamma reference voltage, a gate low voltage, a gate high voltage, a pixel driving voltage, a cathode voltage, and the like. The gamma reference voltage is supplied to the data driver 110. A dynamic range of the data voltage output from the data driver 110 is determined by a voltage range of the gamma reference voltage. The dynamic range of the data voltage is the range of voltages between the uppermost grayscale voltage and the lowermost grayscale voltage.

The gate high voltage and the gate low voltage are supplied to a level shifter 150 and the gate driver 120. The constant voltages such as the pixel driving voltage and a cathode voltage are supplied to the pixels 101 through the power lines commonly connected to the pixels 101. The pixel driving voltage may be supplied from a main power source of the host system 200 to the display panel 100. In this case, the power supply 140 does not need to output the pixel driving voltage.

The display panel driving circuit writes the pixel data of the input image to the pixels of the display panel 100 under the control of the timing controller 130. The display panel driving circuit includes the data driver 110 and the gate driver 120.

The display panel driving circuit may further include a touch sensor driver for driving touch sensors. The touch sensor driver is omitted from FIG. 1 to FIG. 2B. The data driver 110 and the touch sensor driver may be integrated into a single drive integrated circuit (IC). In a mobile terminal or a wearable terminal, the timing controller 130, the power supply 140, the level shifter 150, the data driver 110, the touch sensor deriver, and the like may be integrated into one drive IC (DIC) as shown in FIGS. 2A and 2B.

The data driver 110 may be integrated into a drive IC (DIC) and electrically connected to the data lines of the display panel 100. The data driver 110 receives the pixel data of the input image received as a digital signal from the timing controller 130 and outputs the data voltages. The data driving unit 110 converts pixel data of an input image into a gamma compensation voltage using a digital to analog converter (DAC) to output the data voltages. The gamma reference voltage is divided into the gamma compensation voltage for each grayscale by a voltage divider circuit in the data driver 110, which is supplied to the DAC. The DAC generates the data voltages as the gamma compensation voltages corresponding to the grayscale values of the pixel data. The data voltages output from the DAC are output to the data lines 102 through output buffers in the respective data output channels of the data driver 110.

The display panel driving circuit may further include a de-multiplexer disposed between the data driver 110 and the data lines 102. The de-multiplexer is omitted from the drawing. The de-multiplexer sequentially supplies the data voltages output through the channels of the data driver 110 to the data lines 102. When the de-multiplexer is added, the number of channels in the data driver 110 may be reduced. In the display panel driving circuit, the de-multiplexer array may be omitted.

The gate driver 120 may be formed on the display panel 100 together with a TFT array of the pixel array and the wires. The gate driver 120 may be disposed in the non-display area NA of the display panel 100 outside the display area AA, or at least a portion thereof may be disposed in the display area AA.

The gate driver 120 may be disposed on either one side of a left non-display area NA or a right non-display area NA outside the display area AA in the display panel 100 to supply the gate signals to the gate lines 103 in a single feeding method. In the single feeding method, the gate signals are applied to one ends of the gate lines. The gate driver 120 may be disposed in the left non-display area NA and the right non-display area NA of the display panel 100 to apply the gate signals to the gate lines 103 in a double feeding method. In the double feeding method, the gate signals are applied simultaneously at both ends of the gate lines 103. At least some circuits of the gate driver 120 may be disposed within the display area AA.

The gate driver 120 may include one or more shift registers. The gate signal may include a scan signal and an emission signal. In this case, the gate driver 120 may include a shift register for sequentially outputting pulses of the scan signal and a shift register for sequentially outputting pulses of the emission signal. The shift register receives a clock signal through the level shifter 150 to output a pulse of the gate signal, and supplies the gate signal to the gate lines 103 while shifting the pulse.

The timing controller 130 receives from the host system 200 the pixel data of the input image and a timing signal synchronized with the pixel data. The timing signal may include a vertical synchronization signal Vsync, a horizontal synchronization signal Hsync, and a data enable signal DE. Since a vertical period and a horizontal period may be known by counting the data enable signal DE, the vertical synchronization signal Vsync and the horizontal synchronization signal Hsync may be omitted. The data enable signal DE has a period of one horizontal period (1H).

The timing controller 130 controls the display panel driving circuit 110 and 120 by generating signals or timing information for controlling the operation timing of the display panel driving circuit 110 and 120 based on the timing signals (e.g., Vsync, Hsync, and DE) received from the host system 200.

A gate timing control signal generated from the timing controller 130 may be input to the shift register of the gate driver 120 through the level shifter 150. The level shifter 150 may receive the gate timing control signal and generate a clock to provide it to the shift register of the gate driver 120. The input signal to the level shifter 150 is a signal of a digital signal voltage level. The output signal of the level shifter 150 includes a clock of an analog voltage that swings between a gate high voltage and a gate low voltage. The data timing control signal generated from the timing controller 130 is transmitted to the data driver 110.

The host system 200 may scale an image signal from a video source to match the resolution of the display panel 100, and may transmit it to the timing controller 130 together with the timing signal. In a mobile system, the host system 200 may be implemented with an application processor (AP). The host system 200 may transmit the pixel data of the input image to the drive IC (DIC) shown in FIGS. 2A and 2B through a mobile Industry Processor Interface (MIPI). The host system 200 may be electrically connected to the drive IC (DIC) through a flexible printed circuit, for example, a flexible printed circuit (FPC), as shown in FIG. 2A. The drive IC (DIC) may be attached on the display panel 100 during a chip on glass (COG) process. The drive IC (DIC) may be electrically connected to the wirings on the display panel 100 as a chip on film (COF) structure mounted on a flexible circuit film, as shown in FIG. 2B.

The timing controller 130 or the host system 200 may enter a low power mode when a still image or always on display (AOD) data is input to reduce power consumption of the display device. In a normal mode, the pixels 101 may have a refresh rate of 60 Hz, 144 Hz, 240 Hz, or the like. The refresh rate is the frequency at which pixel data is written to the pixels 101. In the low power mode, the refresh rate of the pixels 101 is lowered to a frequency lower than 60 Hz, for example, 1 Hz to 30 Hz. When the refresh rate is 1 Hz, a first frame out of 60 frames per second, may be a refresh frame, and the next 59 frames may be holding frames. After a data voltage Vdata of the pixel data is charged to the pixels 101 during a refresh frame period, the pixels 101 may maintain the data voltage charged in a previous refresh frame without newly charging the data voltage Vdata during the continuous holding frame period to maintain an emitting state.

Figure 3:
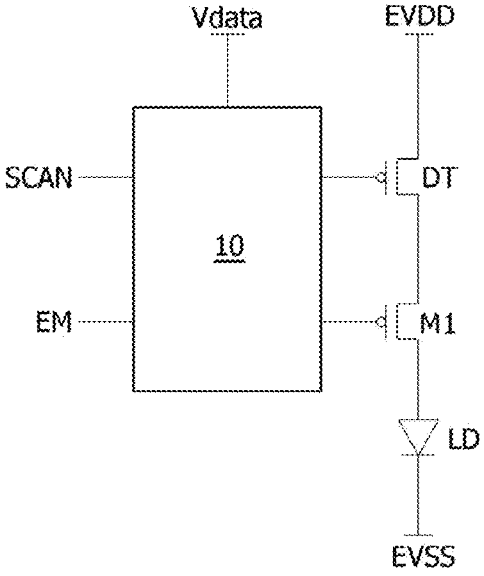
FIG. 3 is a diagram schematically illustrating an example of a pixel circuit according to one embodiment of the present disclosure.

FIG. 3 is a diagram schematically illustrating an example of a pixel circuit according to one embodiment of the present disclosure. FIG. 3 illustrates, but is not limited to, an example in which a driving element DT and a switch element M1 is implemented as a p-channel transistor.

Referring to FIG. 3, the pixel circuit includes a light-emitting element LD, a driving element DT, a switch element M1, and a compensation circuit 10.

The light-emitting element LD may be implemented as an organic light-emitting diode (hereinafter referred to as "OLED"), which includes an anode electrode and a cathode electrode, or as an inorganic light-emitting element such as a micro-LED. The light-emitting element LD may be driven by a current from the driving element DT to emit light.

The OLED includes an anode electrode, a cathode electrode, and an organic compound layer interposed between these electrodes. The organic compound layer may include, but is not limited to, a hole injection layer (HIL), a hole transport layer (HTL), a light-emitting layer (EML), an electron transport layer (ETL), and an electron injection layer (EIL). When a voltage is applied to the anode and cathode electrodes of the light-emitting element LD, holes passing through the hole transport layer (HTL) and electrons passing through the electron transport layer (ETL) move to the light-emitting layer (EML) to form excitons. In this case, visible light is emitted from the light-emitting layer EML. The OLED may be implemented as an OLED having a tandem structure in which a plurality of light-emitting layers are stacked. The OLED having the tandem structure may improve the luminance and lifespan of the pixels.

Inorganic light-emitting elements may be implemented as a micro-LED chip having a vertical structure in which electrodes are disposed above and below the chip with the light-emitting elements integrated therein, or a lateral structure or a flip-chip structure.

Figure 4:
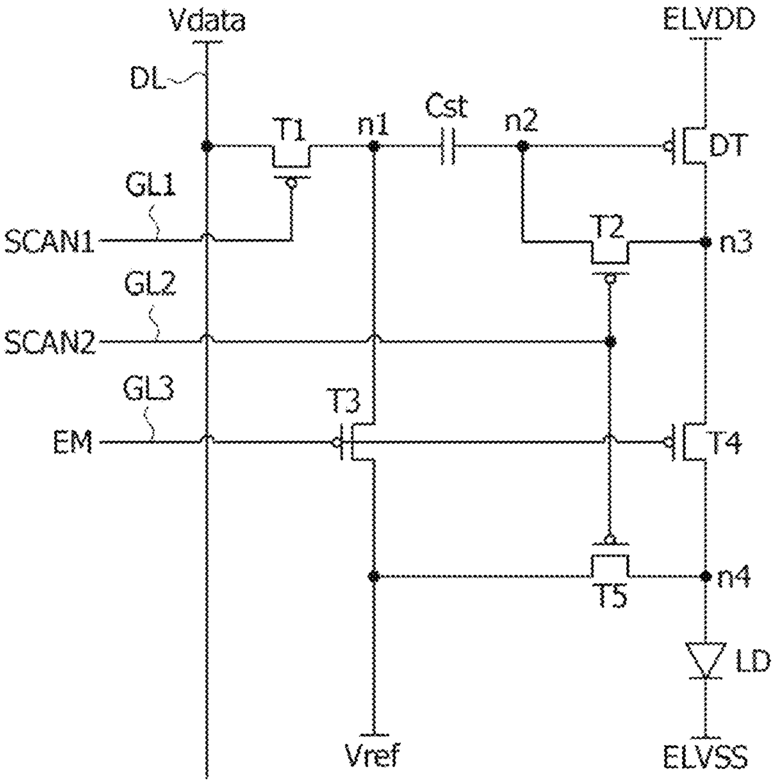
FIGS. 4 to 6 are circuit diagrams illustrating the pixel circuit in detail according to one embodiment of the present disclosure.

The driving element LD, the light-emitting element LD, and the switch element M1 may be connected in series between a pixel driving voltage EVDD and a cathode voltage EVSS. In FIG. 4, the light-emitting element LD is connected between the switch element M1 and the cathode voltage EVSS, but is not limited thereto. The light-emitting element LD may be connected between the pixel driving voltage EVDD and the driving element DT.

The driving element DT regulates the current flowing through a drain-to-source channel based on a gate-to-source voltage thereof. The gate-to-source voltage of the driving element DT is varied with the data voltage Vdata of the pixel data applied to a gate electrode of the driving element DT. A storage capacitor, not shown in this drawing, is connected between the gate electrode and a source electrode of the driving element DT.

The switch element M1 switches a current path between the pixel driving voltage EVDD and the cathode voltage EVSS. The switch element M1 may be turned on by a gate-on voltage of an emission signal EM applied to its gate electrode. When the switch element M1 is turned on, the driving element DT and the light-emitting element LD may be electrically connected so that a current is supplied to the light-emitting element LD. When the first switch element M1 is turned off, the current path between the pixel driving voltage EVDD and the cathode voltage EVSS is blocked so that no current is supplied to the light-emitting element LD. A switch element, not shown in this drawing, may be connected between the pixel drive voltage EVDD and the drive element DT.

The compensation circuit 10 receives gate signals such as one or more scan signals SCAN, the emission signal EM, and the data voltage Vdata of the pixel data. The compensation circuit 10 is connected to the drive element DT and the switch element M1. The compensation circuit 10 may initialize main nodes of the pixel circuit and the storage capacitor in response to a pulse of the scan signal SCAN. The compensation circuit 10 may apply the data voltage Vdata to the storage capacitor and the gate electrode of the driving element DT, sample a threshold voltage of the driving element DT, and compensate for the gate-to-source voltage of the driving element DT by the amount of the threshold voltage. This compensation circuit 10 may compensate for the threshold voltage deviation of the driving element DT using a source follower or a diode connection circuit.

Figure 5:
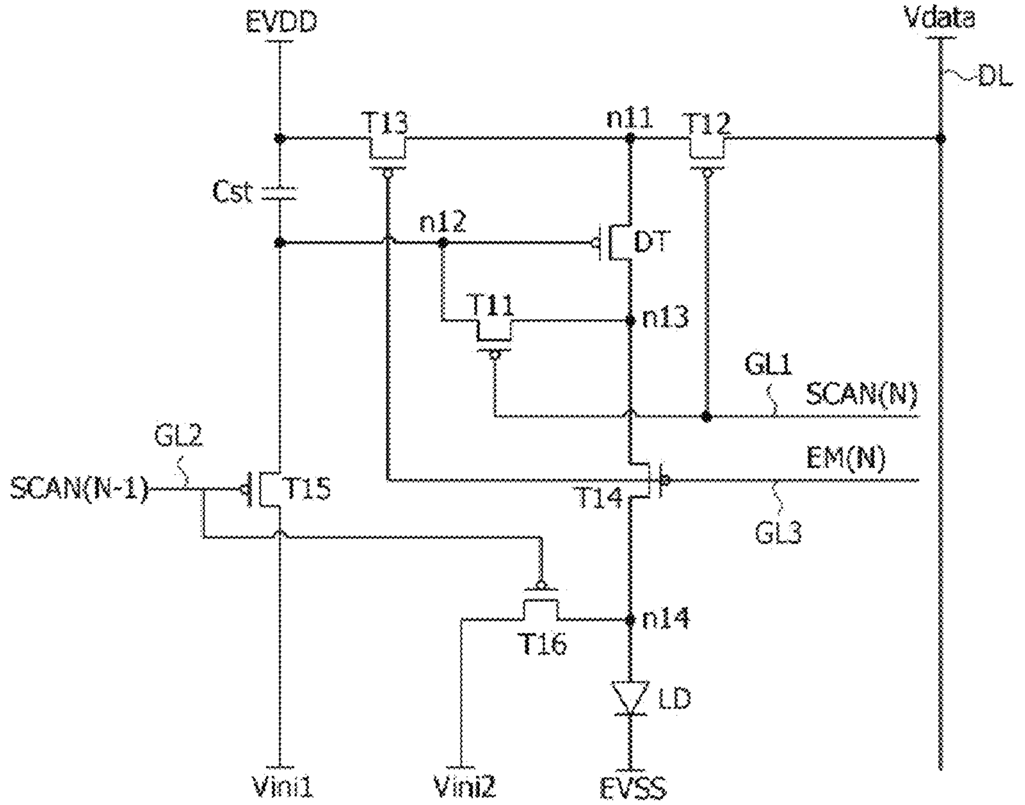
Figure 6:
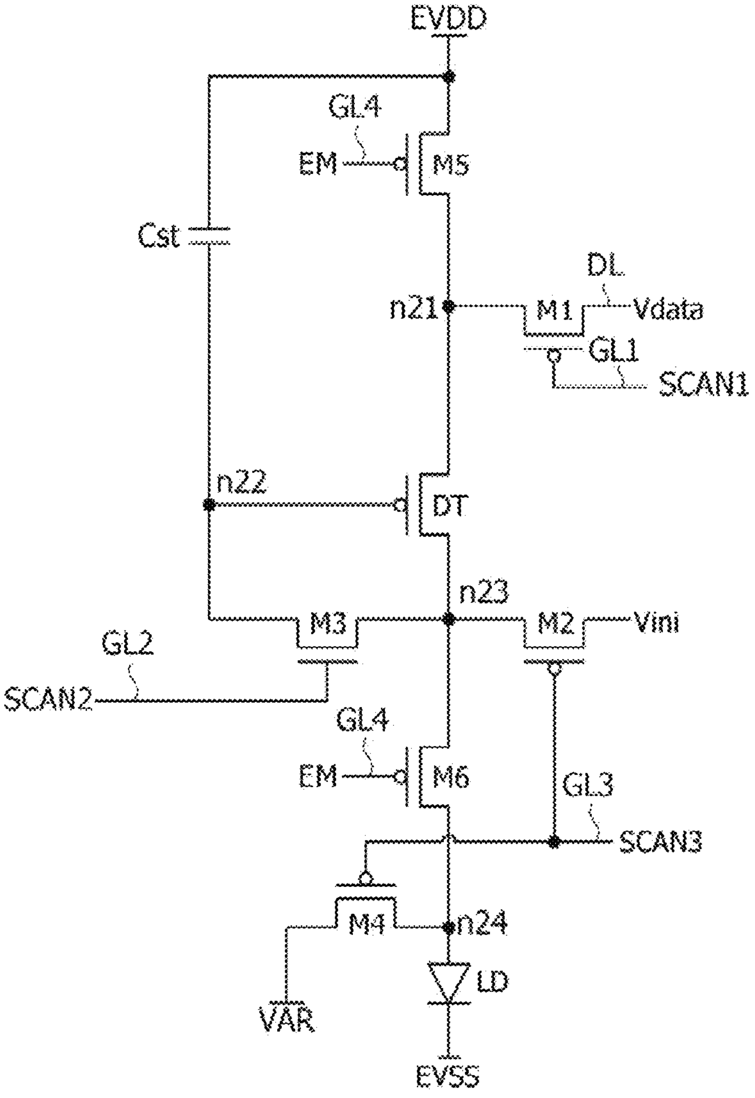

FIGS. 4 to 6 are circuit diagrams illustrating the pixel circuit in detail according to one embodiment of the present disclosure. It should be noted that the present disclosure is not limited to the pixel circuits shown in FIGS. 4 to 6.

Referring to FIG. 4, the pixel circuit includes a light-emitting element LD, a plurality of transistors T1 to T5 and DT, and a capacitor Cst. The transistors T1 to T5 and DT may be implemented as, but are not limited to, p-channel transistors.

A driving element DT generates a current according to a gate-source voltage Vgs to drive the light-emitting element LD. The driving element DT includes a first electrode connected to a VDD node to which the pixel driving voltage EVDD is applied, a gate electrode connected to a second node n2, and a second electrode connected to a third node n3. The VDD node may be connected to a first power wire commonly connected to the pixels.

The capacitor Cst is connected between a first node n1 and the second node n2. The capacitor Cst may be charged with a data voltage Vdata compensated by the amount of a threshold voltage Vth of the driving element DT.

The light-emitting element LD includes an anode electrode connected to a fourth node n4, and a cathode electrode connected to a VSS node to which the cathode voltage EVSS is applied. The VSS node is connected to the cathode electrode or a second power line commonly connected to the pixels.

A first switch element T1 is turned on in response to the gate-on voltage of a scan signal SCAN1 to supply the data voltage Vdata of the pixel data to the first node n1. The first switch element T1 includes a gate electrode connected to a first gate line GL1, a first electrode connected to a data line DL, and a second electrode connected to the first node n1.

A second switch element T2 is turned on in response to the gate-on voltage of the second scan signal SCAN2 to connect the gate electrode and the second electrode of the driving element DT. The second switch element T2 includes a gate electrode connected to a second gate line GL2, a first electrode connected to the second node n2, and a second electrode connected to the third node n3.

A third switch element T3 is turned on in response to the gate-on voltage of an emission signal EM to supply a reference voltage Vref to the first node n1. The third switch element T3 includes a gate electrode connected to a third gate line GL3, a first electrode connected to the first n1, and a second electrode connected to a reference voltage node. The reference voltage node is connected to a third power wire commonly connected to the pixels.

A fourth switch element T4 is turned on in response to the gate-on signal of the emission signal EM to switch a current path of the light-emitting element LD. A gate electrode of the fourth switch element T4 is connected to the third gate line GL3. A first electrode of the fourth switch element T4 is connected to the third node n3, and a second electrode of the fourth switch element T4 is connected to the fourth node n4.

A fifth switch element T5 is turned in response to the second scan signal SCAN2 to supply the reference voltage Vref to the fourth node n4. The fifth switch element T5 includes a gate electrode connected to the second gate line GL2, a first electrode connected to the reference node, and a second electrode connected to the fourth node n4.

Referring to FIG. 5, the pixel circuit includes a light-emitting element LD, a plurality of transistors T11 to T16 and DT, and a capacitor Cst. The transistors T11 to T16 and DT may be implemented as, but are not limited to, p-channel TFT (PMOS).

A driving element DT generates a current according to a gate-source voltage Vgs to drive the light-emitting element LD. The driving element DT includes a first electrode connected to a first node n11, a gate electrode connected to a second node n12, and a second electrode connected to a third node n13.

The capacitor Cst is connected between a VDD node and the second node n12. A pixel driving voltage EVDD is connected to the VDD node.

The light-emitting element LD includes an anode electrode connected to a fourth node n14 and a cathode electrode connected to a VSS node to which a cathode voltage EVSS is applied.

A first switch element T11 is turned on in response to an (N)th (where N is a natural number) scan signal SCAN(N) to connect the gate electrode and the second electrode of the driving element DT. The first switch element T11 includes a gate electrode connected to the first gate line GL1, a first electrode connected to the gate electrode of the driving element DT, and a second electrode connected to the second electrode of the driving element DT. The (N)th scan signal SCAN(N) is applied to the pixel circuit through the first gate line GL1.

A second switch element T12 is turned on in response to the (N)th scan signal SCAN(N) to connect the data line DL to which the data voltage Vdata of the pixel data is applied to the first node n11. The second switch element T12 includes a gate electrode connected to the first gate line GL1, a first electrode connected to the first n11, and a second electrode connected to the data line DL.

A third switch element T13 is turned-on in response to an emission signal EM(N) to connects the VDD node to which the pixel driving voltage EVDD is applied to the first node n11. The third switch element T13 includes a gate electrode connected to the second gate line GL3 to which the emission signal EM(N) is applied, a first electrode connected to the VDD node, and a second electrode connected to the VSS node n11.

A fourth switch element T14 is turned on in response to the emission signal EM(N) to connect the second electrode of the driving element DT to the anode electrode of the light-emitting element LD. A gate electrode of the fourth switch element T14 is connected to the third gate line GL3. A first electrode of the fourth switch element T14 is connected to the third node n13, and a second electrode of the fourth switch element T14 is connected to the fourth node n14.

A fifth switch element T15 is turned on in response to an (N−1)th scan signal SCAN to connect a first initialization voltage node to which a first initialization voltage Vini1 is applied to the first node n12. The first initialization voltage Vini1 is applied to the pixel circuit through a first initialization voltage line commonly connected to the first initialization voltage node of the pixels. The fifth switch element T15 includes a gate electrode connected to the second gate line GL2, a first electrode connected to the second node n12, and a second electrode connected to the first initialization voltage node.

A sixth switch element T16 is turned on in response to the (N−1)th scan signal SCAN (N−1) to connect a second initialization voltage node to which a second initialization voltage Vini2 is applied to the fourth node n14. The second initialization voltage Vini2 is applied to the pixel circuit through a second initialization voltage line commonly connected to the second initialization voltage node of the pixels. The second initialization voltage Vini2 may be set to a voltage equal to or different from the first initialization voltage Vini1. The sixth switch element T16 includes a gate electrode connected to the second gate line GL2, a first electrode connected to the second reference voltage node, and a second electrode connected to the fourth node n14.

Referring to FIG. 6, a pixel circuit includes a plurality of transistors M1 to M7, and a capacitor Cst.

A third switch element M3 may be implemented as an n-channel oxide TFT having a low off-current. A driving element DT may be implemented as a p-channel LTPS TFT having high on-current characteristics. A first, second, fourth, fifth, and sixth switch elements M1, M2, M4, M5, and M6 may be implemented as a p-channel LTPS TFT.

The driving element DT includes a gate electrode connected to a second node n22, a first electrode connected to a first node n21, and a second electrode connected to a third node n23. The capacitor Cst is connected between the VDD node, to which the pixel driving voltage VDD is applied, and the second node n22.

A light-emitting element LD includes an anode electrode connected to a fourth node n24 and a cathode electrode to which the cathode voltage EVSS is applied.

The first switch element M1 is connected between the data line DL and the first node n21. The first switch element M1 is turned on in response to a first scan signal SCAN1. When the first switch element M1 is turned on, the data line DL to which the data voltage Vdata of the pixel data is applied is connected to the first node n21. The first switch element M1 includes a gate electrode connected to the first gate line GL1 to which the first scan signal SCAN1 is applied, a first electrode connected to the data line DL, and a second electrode connected to the first node n21.

The second switch element M2 is connected between the third node n23 and an initialization voltage node to which an initialization voltage Vini is applied. The second switch element M2 is turned on in response to a third scan signal SCAN3. When the second switch element M2 is turned on, the initialization voltage Vini is applied to the third node n23. The second switch element M2 includes a gate electrode connected to a third gate line GL3 to which the third scan signal SCAN3 is applied, a first electrode connected to the third node n23, and a second electrode connected to the initialization voltage node.

The third witch element M3 is connected between the second node n22 and the third node n23. The third switch element M3 is turned on in response to a second scan signal SCAN2. When the third switch element M3 is turned on, the second node n22 is connected to the third node n23. The third switch element M3 includes a gate electrode connected to the second gate line GL2 to which the second gate signal SCAN2 is applied, a first electrode connected to the second node n22, and a second electrode connected to the third node n23.

The fourth switch element M4 is connected between the fourth node n24 and a compensation voltage node to which a compensation voltage VAR is applied. The fourth switch element M4 is turned on in response to the third scan signal SCAN3. When the fourth switch element M4 is turned on, the compensation voltage node is connected to the fourth node n24. The fourth switch element M4 includes a gate electrode connected to the third gate line GL3, a first electrode connected to the fourth n24, and a second electrode connected to the compensation voltage node.

The fifth capacitor M5 is connected between the VDD node to which the pixel driving voltage EVDD is applied and the first node n21. The fifth switch element M5 is turned on in response to an emission signal EM. When the fifth switch element M5 is turned on, the pixel driving voltage EVDD is applied to the first node n21. The fifth switch element M5 includes a gate electrode connected to a fourth gate line GL4 to which an emission signal EM is applied, a first electrode connected to the VDD node, and a second electrode connected to the first node n21.

The sixth switch element M6 is connected between the third node n23 and the fourth node n24. The sixth switch element M6 is turned on in response to the emission signal EM to connect the third node n23 to the fourth node n24. The sixth switch element M6 includes a gate electrode connected to a fourth gate line GL4, a first electrode connected to the third node n23, and a second electrode connected to the fourth node n24.

Figure 7:
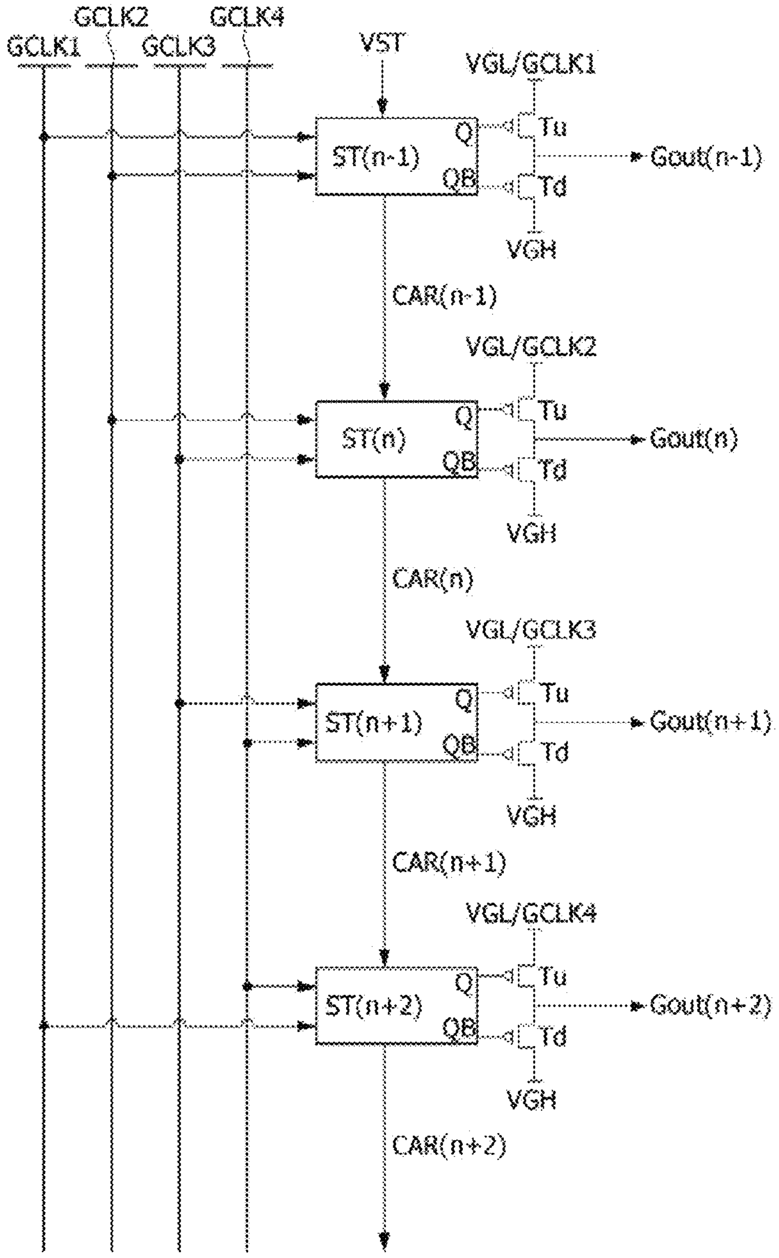
FIG. 7 is a diagram schematically illustrating a gate driver according to one embodiment of the present disclosure.

FIG. 7 is a diagram schematically illustrating the gate driver according to one embodiment of the present disclosure.

Referring to FIG. 7, the shift register in the gate driver 120 includes a plurality of signal transmission parts ST(n−1) to ST (n+2).

The signal transmission parts ST(n−1) to ST(n+2) are connected to clock wires to which clocks GCLK1 to GCLK4 are applied from the level shifter 150. The signal transmission parts ST(n−1) to ST(n+2) are cascade-connected through carry signal wires to which carry pulses CAR(n−1) to CAR(n+2) are applied. The clocks GCLK1 and GCLK4 may be illustrated as 4-phase clocks in FIG. 7, but are not limited thereto. For example, an i-phase (where i is a natural number greater than or equal to 2) may be entered in the shift register.

Each of the signal transmitters ST(n−1) to ST(n+2) includes a VST node to which a start pulse VST is input, a CLK node to which clocks GCLK1 to GCLK4 are input, a first output node from which a pulse of gate signals Gout (n−1) to Gout(n+2) are output, and a second output node from which carry pulses CAR n−1) to CAR(n+2) are output. The first output node, from which the gate pulse is output, is connected to the gate line of the display panel. The gate pulses Gout(n−1) to Gout(n+2) and the carry pulses CAR (n−1) to CAR(n+2) may be output through a common output node. In this case, the second output node and the first output node may be connected to one common output node.

The start pulse VST is generally input to a first signal transmission part. In an example of FIG. 5, an (n−1)th signal transmission part ST(n−1) may be the first signal transmission part. The signal transmission parts ST(n) to ST(n+2) cascade-connected to the (n−1)th signal transmission part [ST(n−1)] are started to be driven when receiving the pulses of the carry signals [CAR(n−1) to CAR(n+2)] as the start pulse from their respective preceding signal transmission parts. The signal transmitters ST(n−1) to ST(n+2) may output the pulses of the carry signals CAR(n−1) to CAR(n+2) through their second output nodes while outputting the pulses of the gate signals Gout(n−1) to Gout(n+2) through their first output nodes, respectively. The gate signal may be the scan signal or the emission signal.

Each of the signal transmission parts ST(n−1) to ST(n+2) includes a first control node Q, a second control node QB, and a buffer circuit. Each of the signal transmission parts ST(n−1) to ST(n+2) may charge and discharge the first and second control nodes Q and QB using a plurality of transistors. A reset pulse from a next signal transmission part may be input to a reset node of the signal transmission parts ST(n−1) to ST(n+2). The signal transmission parts ST(n−1) to ST(n+2) may discharge the first control node Q in response to the reset pulse from the next signal transmission parts.

The buffer circuit outputs the pulse of the gate signal through a pull-up transistor Tu and a pull-down transistor Td to a gate line connected to the pixel circuit through the first output node or the common output node.

When the shift clocks GCLK1 to GCLK4 are input while the first control node Q has been charged, the buffer circuit may supply the gate-on voltage of the shift clocks GCLK1 to GCLK4 or the gate-on voltage applied through the power line to the first output node or the common output node, causing the voltage of the gate signals [Gout(n−1) to Gout (n+2)] to rise up to the gate-on voltage. The buffer circuit may discharge the first output node or the common output node to invert the voltage of the gate signal to the gate-off voltage when the second control node QB is charged.

The pull-up transistor Tu includes a gate electrode connected to the first control node Q, a CLK node to which the shift clock GCLK1 to GCLK4 is input or a first electrode to which the gate-on voltage VGL is applied, and a second electrode connected to the first output node or the common output node. The pull-down transistor Td includes a gate electrode connected to the second control node QB, a first electrode connected to the first output node or the common output node, and a second electrode to which the gate-off voltage VGH is applied.

An inverter circuit, which is omitted in this drawing, may be connected between the first control node Q and the second control node QB. The inverter circuit controls the voltages of the first control node Q and the second control node QB so that the voltages are inverted.

Figure 8:
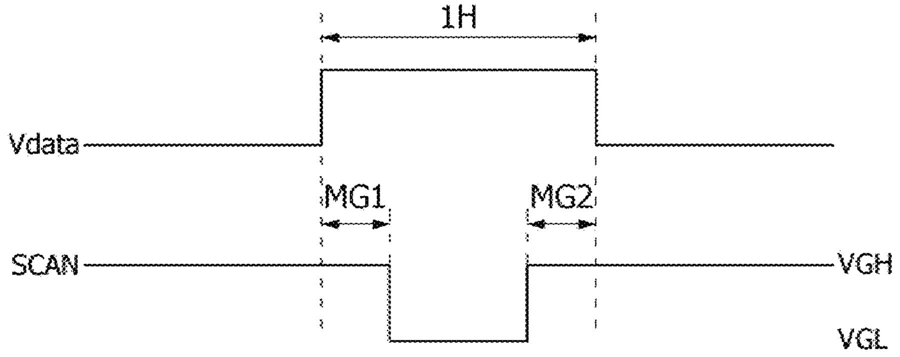
FIG. 8 is a waveform diagram illustrating the margin time between pulses of a data voltage and a scan signal according to one embodiment of the present disclosure.

The delay time of the data voltage and the pulse delay time of the scan signal synchronized with the data voltage are different depending on the position of the display area AA of the display panel 100. For this reason, a margin time MG1 is set between the rising edge of the data voltage and the pulse of the scan signal within one horizontal period (1H), and a margin time MG2 is set between the falling edge of the data voltage and the pulse of the scan signal, as shown in FIG. 8, taking into account the delay time difference between the data voltage and the pulse of the scan signal. As the margin times MG1 and MG2 increase, the amount of charging of the data voltage in the pixel circuit may decrease, and a threshold voltage sampling time of the driving element DT may decrease, causing the threshold voltage deviation compensation performance to deteriorate. According to the present disclosure, the margin times MG1 and MG2 illustrated in FIG. 8 may be reduced by optimizing the position of the drive IC taking into account the delay time of the data voltage Vdata and the pulse delay time of the scan signal over the entire display area AA of the display panel 100.

Figure 9:
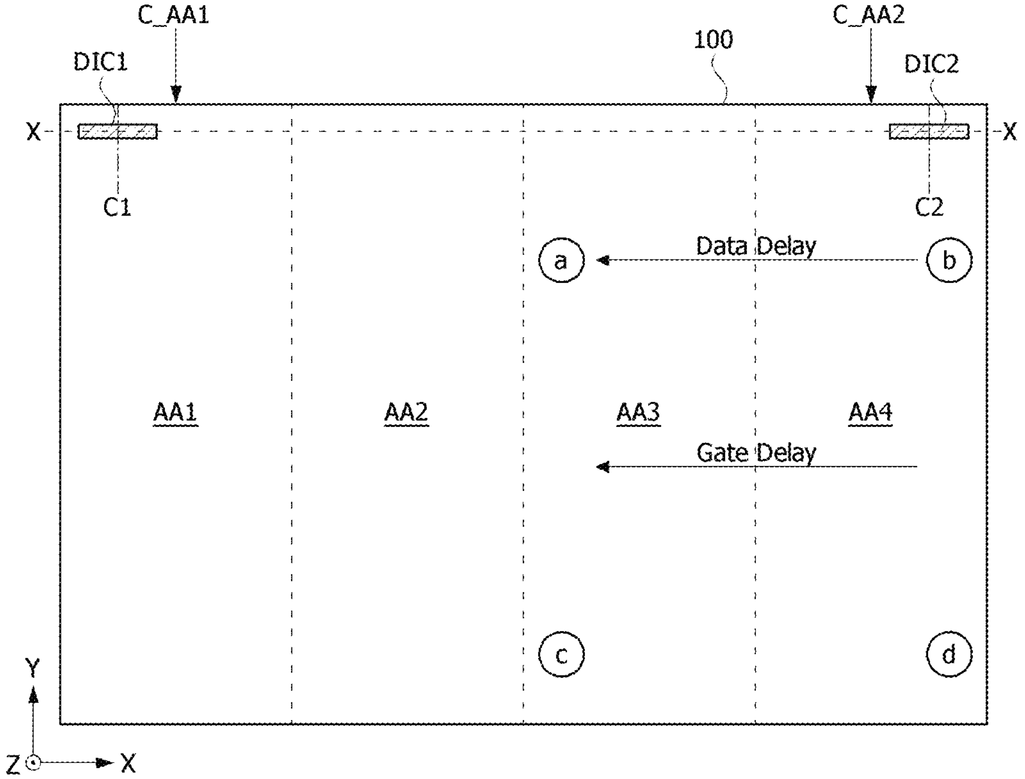
FIGS. 9 and 10 are diagrams illustrating an example in which a plurality of drive ICs is connected to data lines of a display panel in a display device according to one embodiment of the present disclosure.
Figure 10:
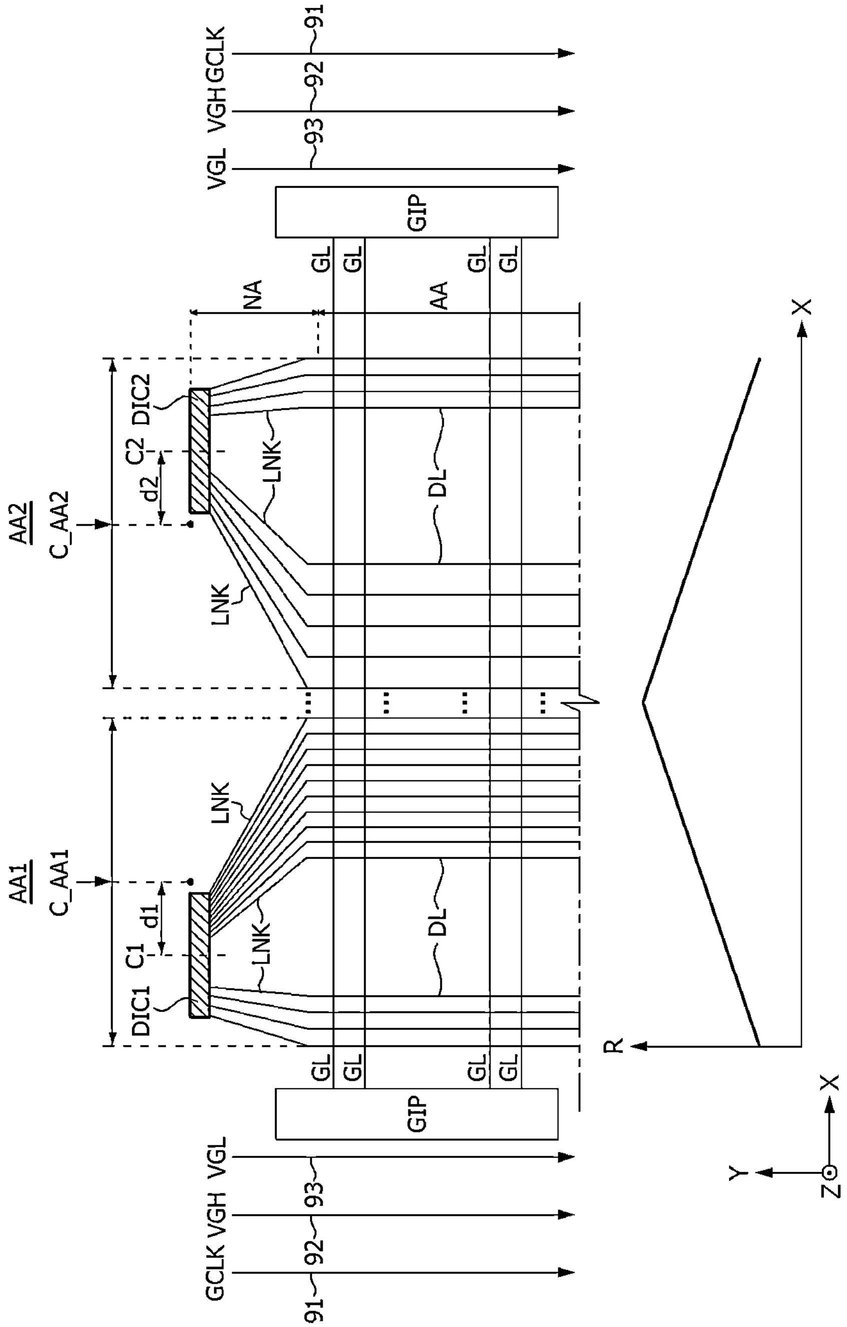

FIGS. 9 and 10 are diagrams illustrating an example in which a plurality of drive ICs is connected to data lines of a display panel in a display device according to one embodiment of the present disclosure.

Referring to FIGS. 9 and 10, the display panel 100 includes a plurality of gate lines GL disposed along a first direction X, and a plurality of data lines DL disposed along a second direction Y that intersect the gate lines GL.

The gate lines GL are disposed on the display panel 100 along the first direction X. The data lines DL are disposed along the second direction Y. The pixel circuits of the sub-pixels are connected to the data lines DL and the gate lines GL.

The data lines GL are connected 1:1 to data link lines LNK disposed in the non-display area NA. Data pads electrically connected to output terminals of the drive ICs DIC1 and DIC2 are connected to ends of the data link lines LNK. The spacing between adjacent date link lines LNK becomes narrow toward the data pads.

The first and second drive ICs DIC1 and DIC2 are connected to the display panel 100 such that the centers C1 and C2 of the first and second drive ICs DIC1 and DIC2 are positioned on an extension line of the first direction X. The drive ICs DIC1 and DIC2 are disposed to be biased to the left and right sides of the display panel 100, respectively. The drive ICs DIC1 and DIC2 are electrically connected to the data lines DL of the display panel 100 in a COG or COF structure. When the display panel 100 is equally divided into four equal parts in the first direction X, the first drive IC DIC1 may be disposed at the top of the leftmost first block AA1 of the display panel 100. The second drive IC DIC2 may be disposed at the top and/or bottom of the uppermost fourth block AA4 of the display panel 100. It should be noted that the division of the display panel 100 into four equal parts does not mean that the display panel 100 is physically divided.

The second and third blocks AA2 and AA3 located in the center of the display panel 100 may not have the drive ICs disposed therein. In FIG. 10, the second and third blocks AA2 and AA3 are not shown.

The first drive IC DIC1 is electrically connected to the data lines DL disposed within the first and second blocks AA1 and AA2 through link lines LNK to supply data voltages to those data lines DL. The second drive IC DIC2 is electrically connected to the data lines DL disposed within the third and fourth blocks AA3 and AA4 through the other link lines LNK to supply data voltages to those data lines DL.

When viewed from the extension line of the first direction X connecting the center C1 of the first drive IC DIC1 and the center C_AA1 of the first block AA1, the center C1 of the first drive IC DIC1 is spaced by a predetermined distance to the left from the center C_AA1 of the first block AA1 present on the extension line of the first direction X, and is positioned as close as possible to the left end of the display panel 100. When viewed from the extension line of the first direction X connecting the center C2 of the second drive IC DIC2 and the center C_AA2 of the second block AA2, the center C2 of the second drive IC DIC2 is spaced by a predetermined distance to the right from the center C_AA2 of the second block AA2, and is positioned as close as possible to the right end of the display panel 100.

Channels of the drive ICs DIC1 and DIC2 are electrically connected to the link lines LNK to output the data voltages to the link lines LNK. Due to the position of the drive ICs DIC1 and DIC2, the resistance R of a link line LNK connected to the center channel of the first drive IC DIC1 is the smallest, and the resistance R of a link line LNK increases toward the right side of the first drive IC DIC1, so that the resistance R of a link line LNK connected to the rightmost channel of the first drive IC DIC1 is greatest. In contrast, the resistance R of a link line LNK connected to the center channel of the second drive IC DIC2 is the smallest, and the resistance R of a link line LNK increases toward the left side of the second drive IC DIC2, so that the resistance of a link line LNK connected to the leftmost channel of the second drive IC DIC2 is greatest.

The length of a link line LNK connected to a right channel far from the center C1 of the first drive IC DIC1 is longer than the length of a link line connected to the center channel located at the center C1 of the first drive IC DIC1. The length of a link line LNK connected to a left channel far from the center C1 of the second drive IC DIC2 is longer than the length of a link line connected to the center channel located at the center C2 of the second drive IC DIC2.

The first drive IC DIC1 is biased to the left of the display panel 100. The length of the link lines LNK electrically connected to the channels of the first drive IC DIC1 increases from the center channel of the first drive IC DIC1 to the rightmost channel of the first drive IC DIC1. The length of a link line electrically connected to the rightmost channel of the first drive IC DIC1 is longer than that of a link line electrically connected to the leftmost channel of the first drive IC DIC1. The second drive IC DIC2 is biased to the left of the display panel 100. The length of the link lines LNK electrically connected to the channels of the second drive IC DIC2 increases from the center channel of the second drive IC DIC2 to the leftmost channel of the second drive IC DIC1. The length of a link line electrically connected to the leftmost channel of the second drive IC DIC2 is longer than that of a link line electrically connected to the rightmost channel of the second drive IC DIC2. Therefore, the resistance of the link lines LNK is small at both sides of the display panel 100 when viewed from the first direction X as shown in FIG. 10, and the resistance increases toward the center of the display panel 100 and is the greatest at the center of the display panel 100.

The resistance of the data lines DL increases as the distance from the drive ICs DIC1 and DIC2 increases. Thus, the resistance of the data lines DL increases from the upper end of the display panel 100 close to the drive ICs DIC1 and DIC2 to the lower side of the display panel 100 when viewed from the second direction Y, and is greatest at the bottom of the display panel 100.

Due to the difference in resistance between the link lines LNK, the delay time of the data voltage Vdata output from the drive ICs DIC1 and DIC2 is small at the left and right sides of the display panel 100 and increases toward the center of the display panel 100. In addition, because the resistance of the data lines DL increases as the distance from the drive ICs DIC1 and DIC2 increases, the delay time of the data voltage Vdata increases as the distance from the drive ICs DIC1 and DIC2 increases, for example, toward the bottom of the display panel 100.

The gate driver GIP may be disposed in the non-display areas on the left and right sides of the display panel. The resistance of the gate lines GL increases as the distance from the gate driver GIP increases. Therefore, like the delay time of the data voltage Vdata, the pulse delay time of the scan signal SCAN output from the gate driver GIP increases toward the center of the display panel 100.

The clocks GCLK1 to GCLK4 from the level shifter are input to the gate driver GIP through clock wires 91 arranged as long wires along the second direction Y in the left non-display area and the right non-display area of the display panel 100. As shown in FIG. 10, the clock wires 91 are formed long along the second direction Y while passing the side of the drive ICs DIC1 and DIC2. The clocks GCLK1 to GCLK4 are applied from the top of the clock wires 91. therefore, the pulse delay time of the clocks GCLK1 to GCLK4 increases toward the bottom of the display panel 100 due to the difference in resistance of the clock wires 91.

The gate-low voltage VGL and the gate-high voltage VGH are input to the gate driver GIP through power lines 92 and 93 disposed in the left non-display area and the right non-display area of the display panel 100. The power wires 92 and 93 are formed long along the second direction Y, passing the drive ICs DIC1 and DIC2, as shown in FIG. 10. The gate-low voltage VGL and gate-high voltage VGH may be applied to the top of the power wires 92, 93. Therefore, the voltage drop between the gate-low voltage VGL and gate-high voltage VGH increases toward the bottom of the display panel 100 due to the difference in resistance between the power wires 92 and 93.

Figure 11:
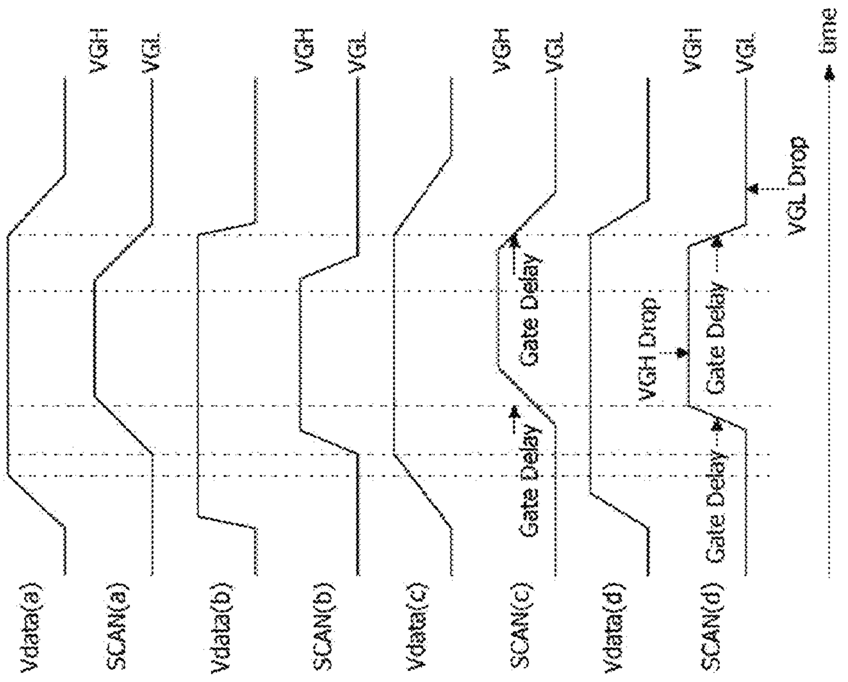
FIG. 11 are waveform diagrams illustrating waveforms of data voltages and scan signals that are measured for respective positions of the display panel shown in FIGS. 9 and 10 according to one embodiment of the present disclosure.

The data voltage Vdata and the scan signal SCAN measured at the four positions (a, b, c, and d) of the display panel 100 are as shown in FIG. 11.

Referring to FIG. 9, the first pixel position (a) is located at the upper center in the display area AA of the display panel 100, so that the pulse delay of the data voltage Vdata and the scan signal SCAN is large. The second pixel position (b) is close to the second drive IC DIC2 and the gate driver GIP in the display area (AA) of the display panel 100, so that the pulse delay of the data voltage Vdata and the scan signal SCAN is small. The third pixel position (c) is located at the lower center in the display area AA of the display panel 100, so that the pulse delay between the data voltage Vdata and the scan signal SCAN is large and the voltage drop between the gate-high voltage VGL and the gate-low voltage VGL is large. The fourth pixel position (d) is close to the second drive IC DIC2 and the gate driver GIP in the display area AA of the display panel 100, so that the pulse delay between the data voltage Vdata and the scan signal SCAN is small, but the voltage drop is large.

As can be seen from FIG. 11, the scan signal SCAN is also delayed at the position of the pixel where the data voltage Vdata is delayed. Accordingly, due to the location of the drive ICs DIC1 and DIC2, the margin times MG1 and MG2 shown in FIG. 8 may be reduced.

Figure 12:
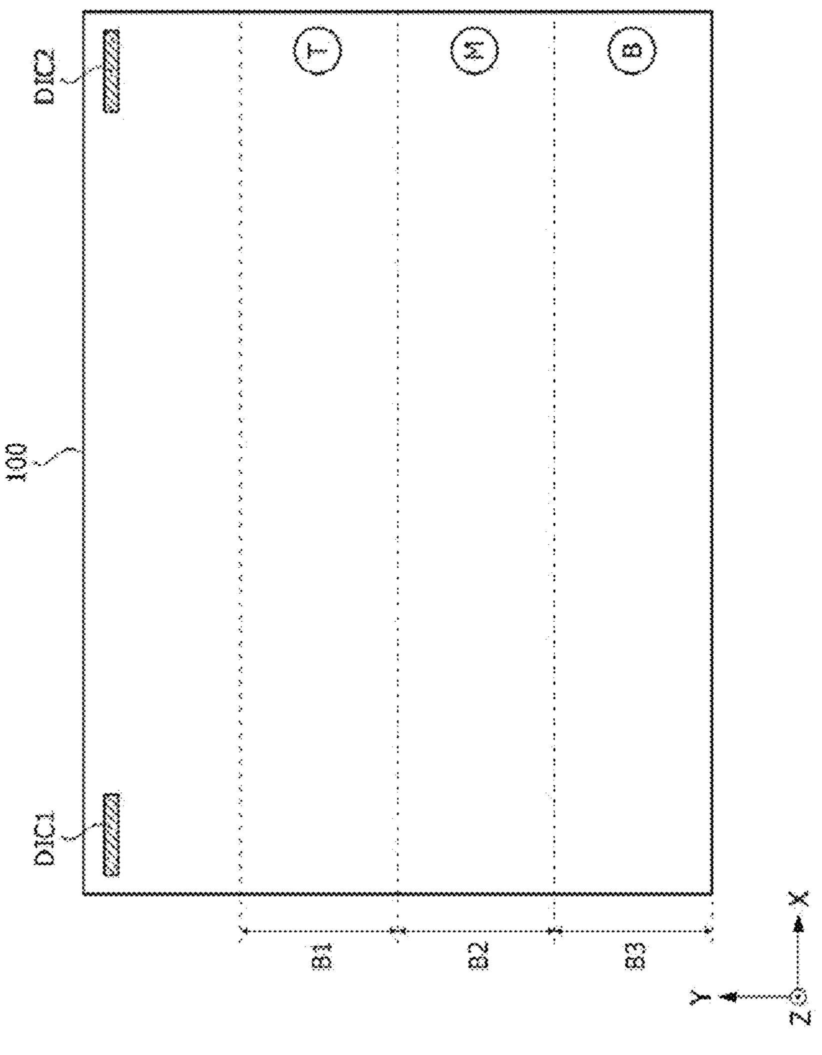
FIGS. 12 and 13 are waveform diagrams illustrating the difference in delay times of the clocks input to the gate driver depending on a position of the display panel according to one embodiment of the present disclosure.
Figure 13:
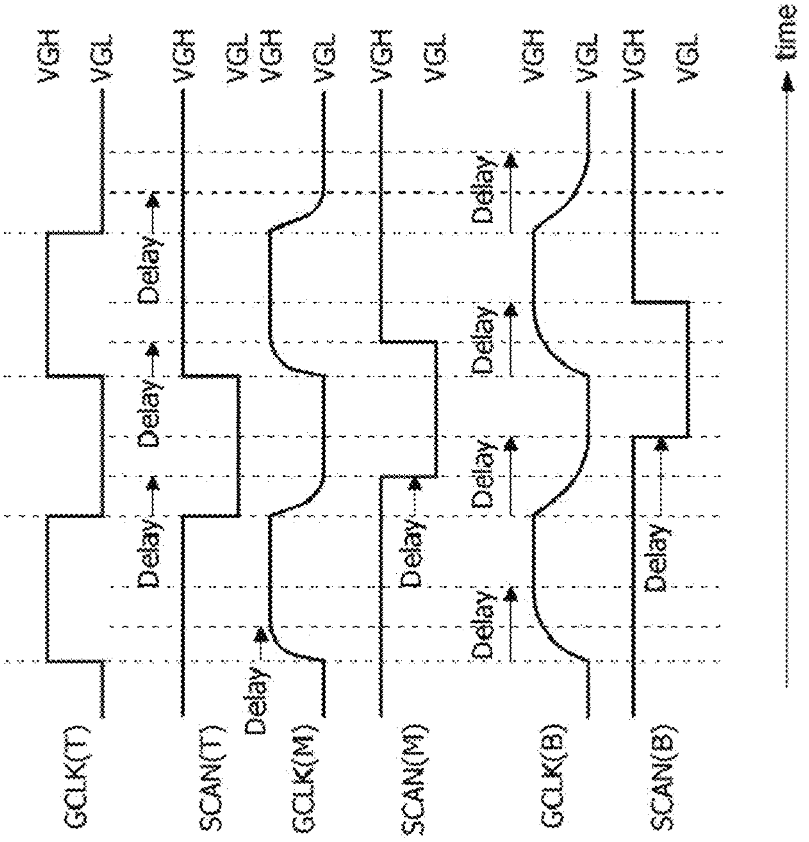

FIGS. 12 and 13 are diagrams illustrating a delay time difference of the clock input to the gate driver depending on the position of the display panel.

Referring to FIGS. 12 and 13, a first clock position T is located on the upper side of the display panel 100 close to the input port to which the clock is applied so that the delay time of the clock GCLK(T) is small. A second clock position M is located at the center of the display panel 100 so that the delay time of the clock GCLK(T) is greater than that of the first clock position T. A third clock position B is located at the lower side of the display panel 100 so that the delay time of the clock GCLK(T) is greater than that of the second clock position M.

The gate driver GIP receives clocks GCLK(T), GCLK (M), and GCLK(B) and outputs the pulse of a scan signals SCAN(T), SCAN(M), and SCAN(B) at the clock timing. Therefore, as shown in FIGS. 12 and 13, when the clocks GCL(T), GCLK (M), and GCLK(B) are delayed, the scan signals SCAN(T), SCAN(M), and SCAN(B) are also delayed by the delay time of the clocks. The margin times MG1 and MG2 are set to account for these clock delays.

Figure 14:
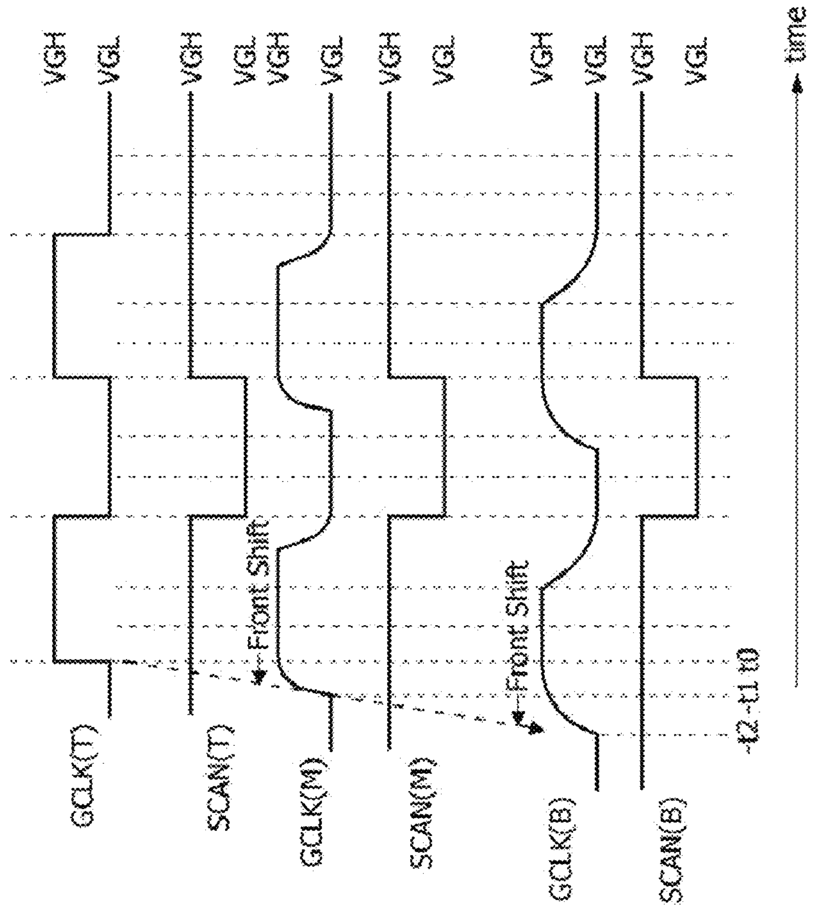
FIGS. 14 to 16 are waveform diagrams illustrating an example of shifting a clock forward from a position far from a clock input port in the display panel according to one embodiment of the present disclosure.
Figure 15:
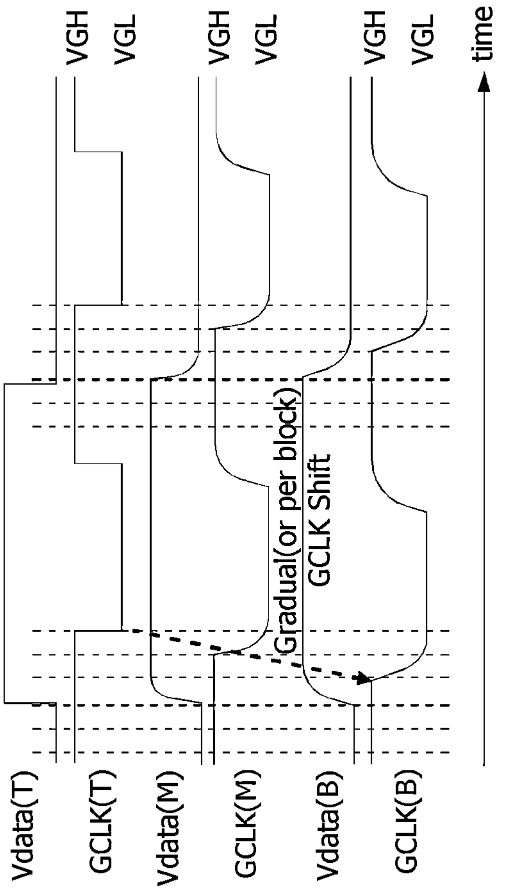
Figure 16:
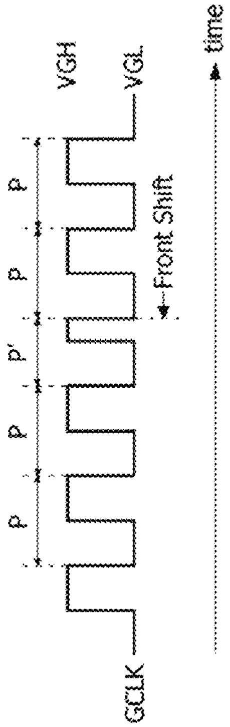
Figure 17:
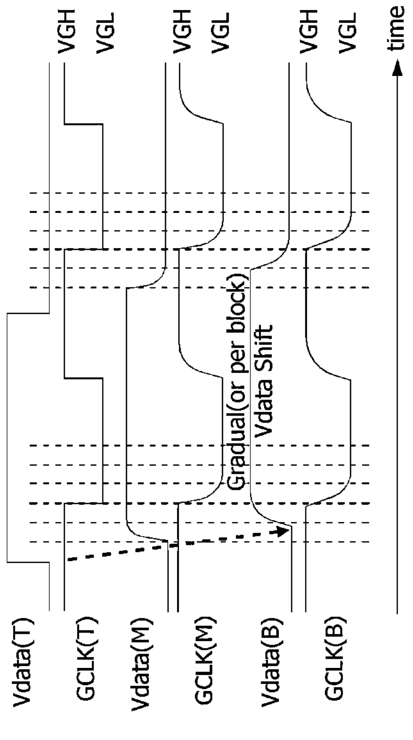
FIGS. 17 to 19 are waveform diagrams illustrating examples in which an output timing of a data voltage is delayed to match the delay time of a clock according to one embodiment of the present disclosure.
Figure 18:
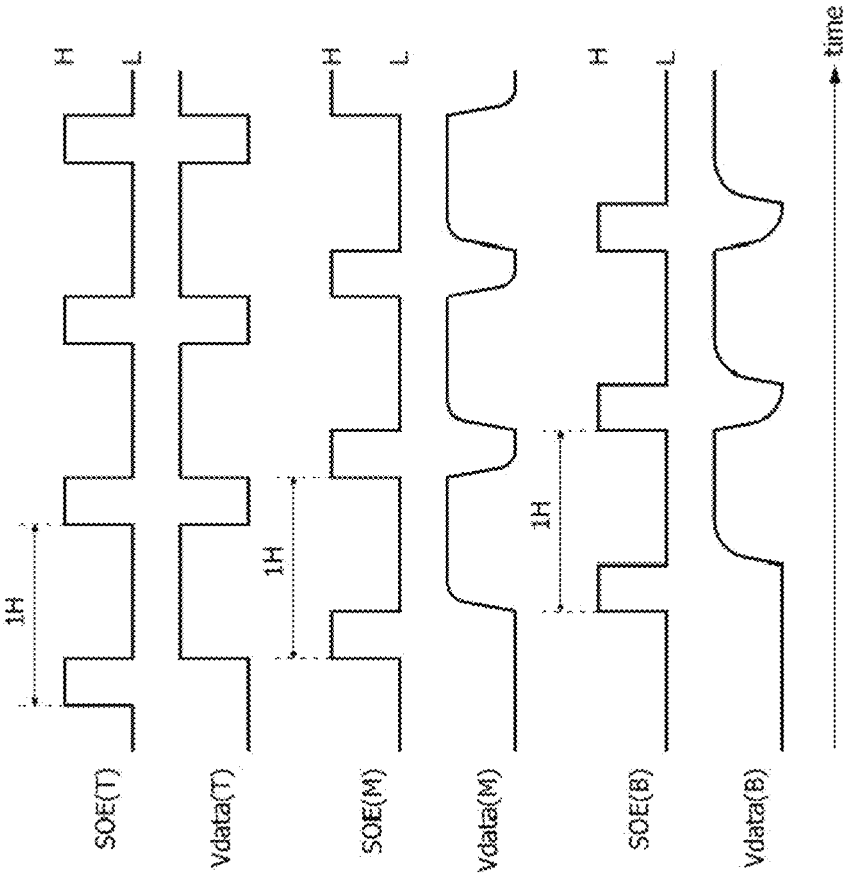

According to the present disclosure, the margin time MG1 and MG2 may be further reduced by shifting the phase of the clock forward on the time base at a position with a large clock delay, as shown in FIGS. 14 to 16, or by delaying the data voltage by the amount of the delay time of the clock, as shown in FIGS. 17 to 18.

FIGS. 14 to 16 are waveform diagrams illustrating examples of shifting a clock forward at a position far from the clock input port in the display panel according to one embodiment of the present disclosure. FIGS. 14 and 15 illustrate examples in which the data voltage is delayed toward the lower side of the display panel and the phase of the clock is shifted forward toward the lower side of the display panel.

Referring to FIGS. 14 and 15, as the distance from the clock input port to which the clock GCLK is input in the display panel 100 increases, the phase of the clock may become faster so that the phase of the clock may be shifted forward.

The pulses of the scan signals SCAN(T), SCAN(M), SCAN(B) begin to be applied to the clock lines from the clock input port and are shifted toward positions far from the clock input port. Thus, the pixels in the upper pixel line are scanned by the clock GCLK(T) input to the gate driver 120 at the first clock position T, and then the pixels in the center pixel line are scanned by the clock GCLK(M) input to the gate driver 120 at the second clock position M. After the pixels in the center pixel line are scanned, the pixels in the lower pixel line are scanned by the clock GCLK(B) input to the gate driver 120 at the third clock position B.

At the first clock position T, the pulse of the scan signal SCAN(T) is applied to the pixels in the upper pixel line by the clock GCLK(T) input to the gate driver 120 so that the pixels in the upper pixel line are scanned. In this case, the pulse rising timing of the scan signal SCAN(T) applied to the pixels in the upper pixel line may be controlled to a preset default time t0 to be synchronized with a data voltage Vdata(T).

Subsequently, the pulse of the scan signal SCAN(M) is applied to the pixels in the center pixel line by the clock GCLK(M) input to the gate driver part 120 at the second clock position M so that the pixels in the center pixel line are scanned. At this time, the phase of the pulse of the scan signal SCAN(M) applied to the pixels in the center pixel line may be controlled at a first adjustment time −t1 earlier than a default time to t0 be synchronized with the data voltage Vdata(M), so that the phase may be shifted forward.

Subsequently, the pulse of the scan signal SCAN(B) is applied to the pixels in the lower pixel line by the clock GCLK(B) input to the gate driver 120 at the third clock position B to scan the pixels in the lower pixel line. At this time, the phase of the pulse of the scan signal SCAN(B) applied to the pixels in the lower pixel line may be controlled at a second adjustment time −t2 earlier than the first adjustment time −t1 to be synchronized with the data voltage Vdata(M), so that the phase may be shifted forward.

Therefore, the phase of the clock input to the gate driver 120 at a second position of the clock wire 91 located far from the clock input port is shifted further forward than the phase of the clock input to the gate driver 120 at a first position of the clock wire 91 located at a first distance from the clock input port and relatively close to the clock input port.

The phase of the clocks GCLK(T), GCLK(M), and GCLK (B) may be adjusted gradually for each pixel line according to the time of the pixels, or may be adjusted on a block-by-block basis B1, B2, and B2 of the display panel 100, as shown in FIG. 12. FIG. 12 shows, but is not limited to, an example in which the display area AA of the display panel 100 is divided into first through third blocks B1, B2 and B2 in the second direction Y. The phase of the clock GCLK(T) for the first block B1 may be set to the default time to, the phase of the clock GCLK(M) for the second block B2 may be set to the first adjustment time −t1, and the phase of the clock GCLK(B) for the third block B3 may be set to the second adjustment time −t2. It should be noted that the blocks are an example of spatial separation of the phase adjustment times of the clocks GCLK(T), GCLK(M), and GCLK(B) rather than physical separation of the display panel 100.

As illustrated in FIG. 15, the delay time of the data voltages Vdata(T), Vdata(M), and Vdata(B) increases with distance from the drive ICs DIC1 and DIC2. When the phase of the clock GCLK(M) is shifted forward, the pulse rising of the delayed scan signal SCAN(M) may be correspondingly faster, which may improve the amount of charging of the data voltage Vdata of the pixel and the threshold voltage sampling time.

Referring to FIG. 16, the phase of the clock GCLK does not change when one period P of the clock GCLK input to the gate driver 120 is constant. When the phase of the clock GCLK is shifted forward, one period P' of the clock GCLK is shortened. To ensure that the pulse width of the gate-on voltage VGL interval of the scan signal SCAN does not change, the gate-off voltage VGH interval immediately before the forward phase shift of the clock GCLK may shortened.

The pixel circuit includes switch elements T1, T2, T13, T11, M1, and M3, i.e., transistors, which are turned on in response to the gate-on voltage of the scan signal SCAN and turned off in response to the gate-off voltage of the scan signal, as shown in FIGS. 4 to 6.

Figure 19:
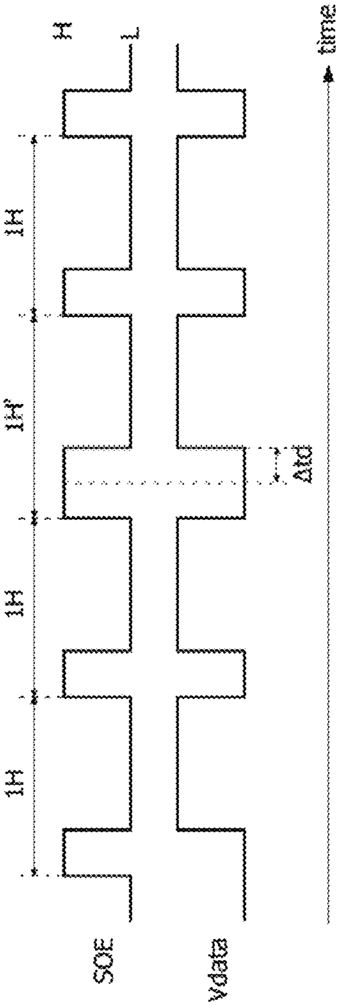

FIGS. 17 to 19 are waveform diagrams illustrating examples in which an output timing of the data voltage is delayed to match the delay time of the clock according to one embodiment of the present disclosure.

Referring to FIGS. 17 and 18, a data timing control signal output from the timing controller 130 may include an output enable signal SOE that controls the output timing of the drive Ics DIC1 and DIC2. The timing controller 130 may control the output enable signal SOE every horizontal period. The drive Ics DIC1 and DIC2 may not output the data voltage Vdata when the voltage of the output enable signal SOE received from the timing controller 130 is a first logic voltage, but may output the data voltage Vdata when the voltage of the output enable signal SOE is a second logic voltage. Here, the first logic voltage may be a high logic voltage (H) and the second logic voltage may be a low logic voltage (L), but are not limited thereto.

The timing controller 130 may adjust the output timing at which the data voltage Vdata output from the drive Ics DIC1 and DIC2 is raised by shifting the pulse phase of the output enable signal SOE forward and backward on the time base, and may also adjust the output time of the data voltage Vdata by adjusting the pulse width of the output enable signal SOE. Under the control of the timing controller 130, the delay time of the output enable signal SOE may be increased at positions farther from the drive Ics DIC1 and DIC2 than at positions closer to them.

As shown in FIGS. 17 and 18, the timing controller 130 may delay the output timing of the data voltages Vdata(T), Vdata(M), and Vdata(B) by the amount of the delay time of the clocks GCLK(T), GCLK(M), and GCLK(B) input to the gate driver 120.

The drive Ics DIC1 and DIC2 output the data voltage Vdata T) synchronized with the pulse of the scan signal SCAN(T) in response to the first output enable signal SOE(T). The pulse of the first output enable signal SOE(T) may be output without delay.

Subsequently, the drive Ics DIC1 and DIC2 output the data voltage Vdata(M) synchronized with the pulse of the scan signal SCAN(M) in response to the second output enable signal SOE(M). The pulse of the second output enable signal SOE(M) may be delayed by a predetermined amount of time, for example, the delay time of the clock GCLK(M), compared to the first output enable signal SOE (T). Therefore, the clock GCLK(M) and the data voltage Vdata(M) may be delayed together by the same amount of time in the same direction.

Subsequently, the drive Ics DIC1 and DIC2 respond to the third output enable signal SOE(B) to output the data voltage Vdata(B) that is synchronized with the pulse of the scan signal SCAN(B). The pulse of the third output enable signal SOE(B) may be delayed by a predetermined amount of time, for example, the delay time of the clock GCLK(M), compared to the second output enable signal SOE(M). Therefore, the clock GCLK(B) and the data voltage Vdata(B) may be delayed together by the same amount of time in the same direction.

As shown in FIG. 19, the pulse of the output enable signal SOE may have a first logic voltage (H) and may be generated at a period of one horizontal period (1H). When the data voltage Vdata is delayed by Δtd, the pulse of the output enable signal SOE may be lengthened, resulting in a longer one horizontal period (1H).

Figure 20:
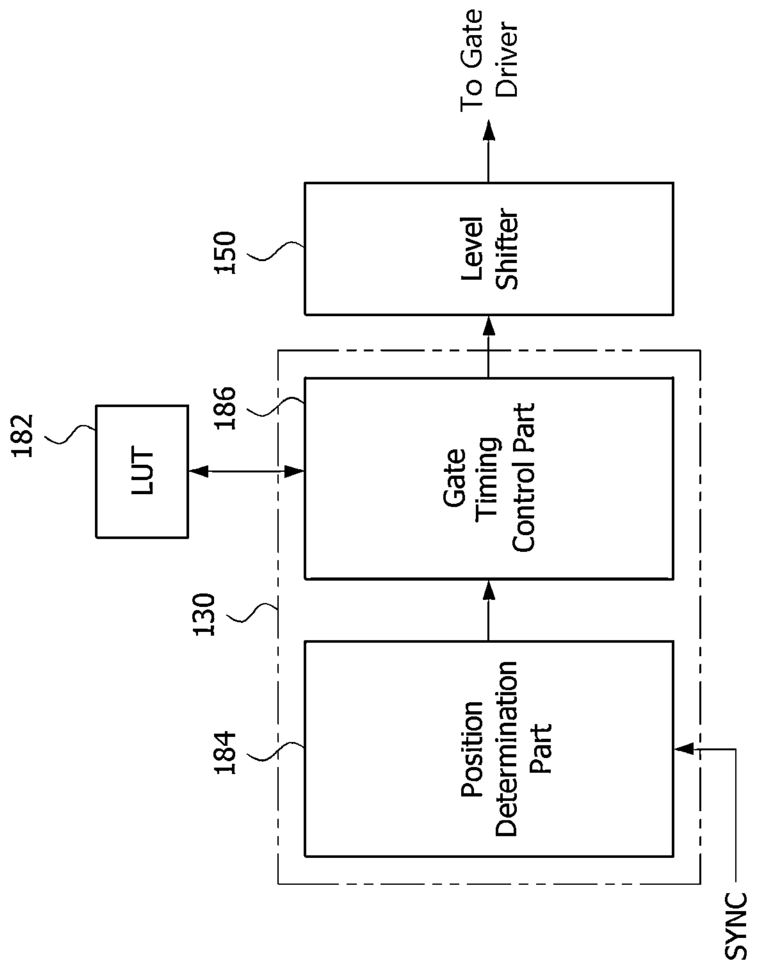
FIG. 20 is a block diagram illustrating a clock control part for controlling a phase of the clock input to the gate driver according to one embodiment of the present disclosure.

FIG. 20 is a block diagram illustrating a clock control part for adjusting the phase of the clock input to the gate driver according to one embodiment of the present disclosure.

Referring to FIG. 20, the clock control part includes a look-up table (LUT) 182 and the timing controller 130.

The lookup table 182 is stored in memory accessible by the timing controller 130, such as a flash memory, or an electrically erasable programmable read-only memory (EEPROM). The lookup table stores phase information t0, −t1, and −t2 of the clock GCLK classified for each the pixel line of the display panel. The phase information t0, −t1, and −t2 of the clock GCLK contains pulse rising and falling timing data of the clock GCLK. The timing controller 130 may control the rising and falling timing of the clock for each position of the pixel lines of the display panel by loading the lookup table 182 into an internal memory after the display device is powered on.

The timing controller 130 includes a position determination part 184 (e.g., a circuit) and a gate timing control part 186 (e.g., a circuit). The position determination part 184 determines the position of the pixel line at which the pixel data is to be written by counting, as a main clock or an internal clock, the timing signal SYNC at which the input image is synchronized with the pixel data. The timing signal SYNC may be, but is not limited to, a data enable signal DE.

The gate timing control part 186 inputs position data from the position determination part 184 into the lookup table 182 and reads out the data in the lookup table 182. When the position data is input, the lookup table 182 outputs the rising and falling timing data of the clock GCLK for each pixel line that is stored at an address indicated by the position data.

The phase of the clock GCLK may be shifted forward or backward according to the data set in the lookup table 182.

The gate timing control part 186 supplies the rising and falling timing data of the clock GCLK to the level shifter 150. The level shifter 150 raises the pulse of the clock GCLK in response to the rising timing data of the clock GCLK, and falls the pulse of the clock GCLK in response to the falling timing data of the clock GCLK, thereby outputting the clock GCLK. The clock GCLK output from the level shifter 150 is input to the gate driver 120 through the clock wires.

Figure 21:
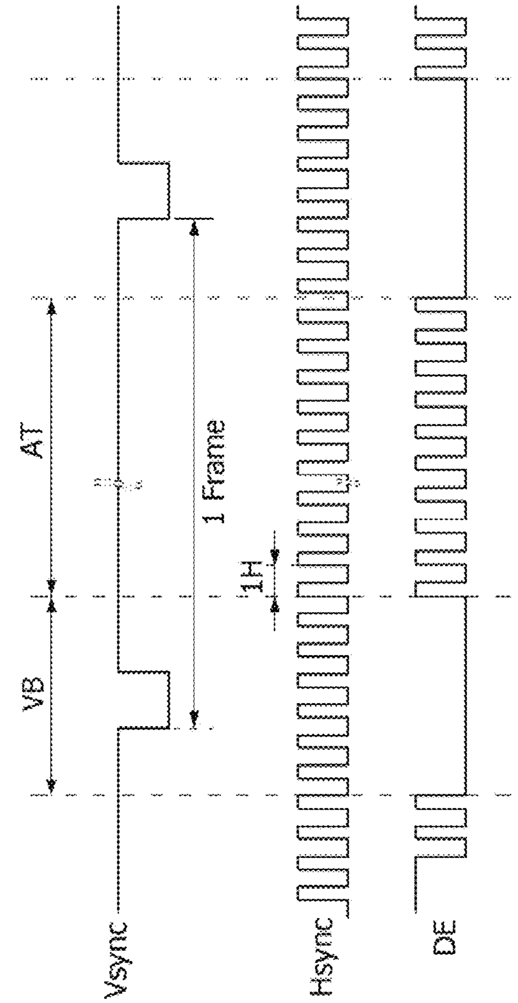
FIG. 21 is a diagram illustrating one frame period and one horizontal period according to one embodiment of the present disclosure.
Figure 22:
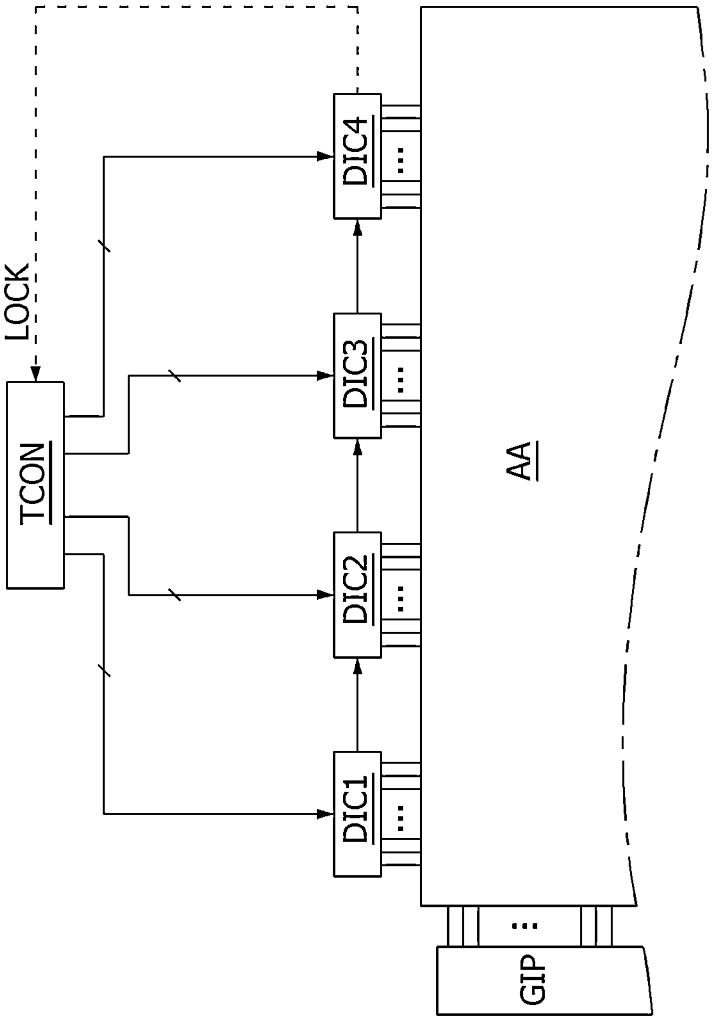
FIG. 22 is a diagram illustrating a transmission line connection structure between a timing controller and source drive ICs on an EPI interface.
Figure 23:
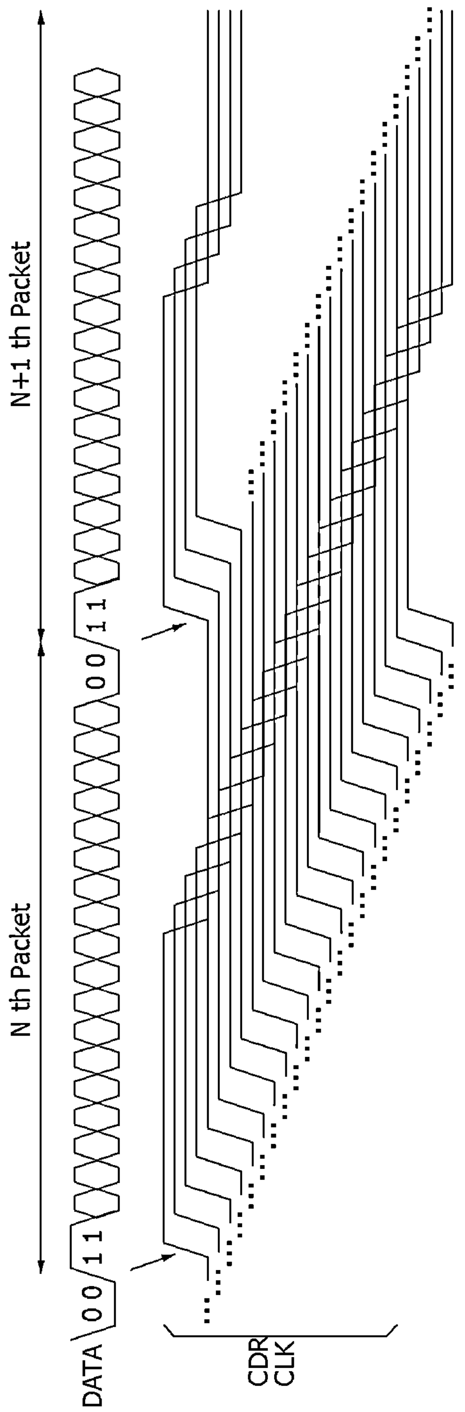
FIG. 23 is a waveform diagram illustrating an example of a multi-phase internal clock generated by the drive ICs according to one embodiment of the present disclosure.

FIG. 21 is a diagram illustrating one frame period and one horizontal period according to one embodiment of the present disclosure. FIG. 22 is a diagram illustrating a transmission line connection structure between the timing controller and the drive ICs on an EPI interface according to one embodiment of the present disclosure. FIG. 23 is a waveform diagram illustrating an example of a multi-phase internal clock generated from the drive ICs according to one embodiment of the present disclosure.

Referring to FIGS. 21 to 23, the vertical synchronization signal Vsync has a period of one frame period and the horizontal synchronization signal Hsync and the data enable signal DE have a period of one horizontal period (1H). The data enable signal DE defines an effective data interval including the pixel data to be written to the pixels. The pulse of the data enable signal DE is synchronized with the pixel data to be written to the pixels 101 of the display panel 100.

One frame period (1 Frame) is divided into an active interval AT in which the pixel data of the input image is written to the pixels 101, and a vertical blank period VB having no pixel data.

A timing controller TCON may send data to drive ICs DIC1 to DIC4 through an EPI (Embedded Clock Point to Point Interface) interface. Although four drive ICs are illustrated in FIG. 22, the number of drive ICs required may be vary depending on the size and resolution of the display panel 100.

The EPI interface may connect the timing controller TCON and the drive ICs DIC1 to DIC4 in a point-to-point fashion, as shown in FIG. 22, to minimize or at least reduce the number of wires needed in transmission lines between the timing controller TCON and the drive ICs DIC1 to DIC4. The transmission line contains a pair of data wires. In the EPI interface, a signal with a built-in clock is transmitted through the pair of data wires. The signal with a built-in clock includes control data to control the drive ICs DIC1 to DIC4 and the gate driver GIP, and the pixel data to be written to the pixels to reproduce the input image on the display area AA. Therefore, the EPI interface does not require separate clock lines and control wires because the signals including the clock, the control data, and the pixel data are transmitted in series through the same pair of wires.

For the EPI interface, each of the drive ICs DIC1 to DIC4 may include a clock recovery circuit for clock and data recovery (CDR). The timing controller TCON sends a clock training pattern (or preamble) signal to the drive ICs DIC1 to DIC4 so that the phase and frequency of the clock being recovered may be locked in the drive ICs DIC1 to DIC4. When the clock training pattern signal and a clock bit in a signal DATA received from the timing controller TCON in series are input through the pair of data wires, the drive ICs DIC1 to DIC4 recover the clock from the clock bit to generate a multi-phase internal clock CDR CLK as shown in FIG. 23. In FIG. 23, "0011" is an example of the clock bit that is serially transmitted to the drive ICs DIC1 to DIC4. The clock bit may also be encoded between data packets.

When the internal clock CDR CLK is locked in phase and frequency, the drive ICs DIC1 to DIC4 feedback a lock signal LOCK of a high logic level, which specifies the steady state of the output, to the timing controller TCON. The lock signal LOCK is sequentially transferred from the first drive IC DIC1 to the fourth drive IC DIC4, and the lock signal LOCK is feedback as an input to the timing controller TCON from the fourth drive IC DIC4 through a lock feedback wire.

In a signal transfer protocol of the EPI interface, the timing controller TCON sends the clock training pattern signal to the drive ICs DIC1 to DIC4 before sending a control data packet and a pixel data packet in which the pixel data of the input image is encoded. The drive ICs DIC1 to DIC4 recover the clock from the signal DATA received through the pair of data wires to generate the internal clock by performing a clock training when the clock training pattern signal is received, and send the lock signal LOCK to the timing controller TCON when the phase and frequency of the internal clock are stably fixed in all the drive ICs DIC1 to DIC4, so that a data link with the timing controller TCON is established.

In response to the lock signal LOCK received from the last drive IC DIC4, the timing controller TCON encodes control data and pixel data in a data packet and begins transmitting it to the drive ICs DIC1 to DIC4 through the pair of data wires. The signal DATA output from the timing controller TCON is converted to a differential signal using a transmission end buffer in the timing controller TCON and transmitted to the drive ICs DIC1 to DIC4 through the pair of data wires. The pair of data wires includes a first wire over which a forward phase signal of the differential signal is transmitted, and a second wire over which a reverse phase signal of the differential signal is transmitted.

The drive ICs DIC1 to DIC4 may recover the control data by sampling control data bits from the signal DATA received through the pair of data wires at the internal clock timing, and may recover the data timing control signal, the gate timing control signal, and the like from the sampled control data.

The drive ICs DIC1 to DIC4 sample the bits of the pixel data from the signal DATA received through the wire pair at the internal clock timing, and then convert the bits of the sampled pixel data to parallel data using a latch. The drive ICs DIC1 to DIC4 input the pixel data from each of the channels to the DAC and output the data voltage Vdata output from the DAC through the output buffer. The data voltage Vdata is supplied to the data lines DL of the display panel 100.

Figure 24:
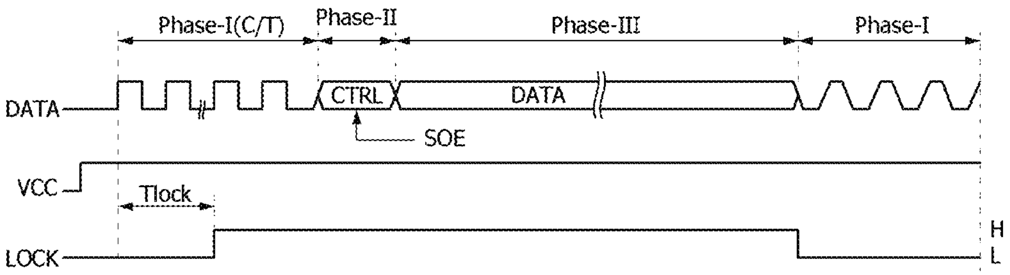
FIG. 24 is a waveform diagram illustrating a signal transfer protocol for the EPI interface according to one embodiment of the present disclosure.

FIG. 24 is a waveform diagram illustrating the signal transfer protocol for the EPI interface according to one embodiment of the present disclosure.

Referring to FIG. 24, the timing controller TCON transmits a clock training pattern signal C/T of a constant frequency to the drive ICs DIC1 to DIC4 in a first phase Phase-I, and when the lock signal LOCK of a high logic level (H) is input through the lock feedback wire, it performs a second phase Phase-II to convert the signal DATA encoded in a signal format defined by the EPI interface protocol to the differential signal and then begins to transmit it through the wire pair. In the second phase Phase-II, a control data packet CTRL is sent to the drive ICs DIC1 to DIC4.

Following the second phase Phase-II, the timing controller TCON performs a third phase Phase-III when the lock signal LOCK is held at the high logic level and transmits the pixel data packet in which the pixel data DATA of the input image is encoded to the drive ICs DIC1 to DIC4.

In FIG. 24, "Tlock" denotes a delay time until the lock signal LOCK is inverted into the high logic level (H). During a delay time Tlock, the clock training pattern signal C/T is sent to the drive ICs DIC1 to DIC4 to lock the frequency and phase of the internal clock, which has been recovered by performing a clock training process in the drive ICs DIC1 to DIC4.

The timing controller TCON re-executes the first phase Phase-I to resume the clock training for the drive ICs DIC1 to DIC4 when the lock signal LOCK of a low logic level (L) is input from the last drive IC DIC4, and transmits the clock training pattern signal C/T to the drive ICs DIC1 to DIC4. If the lock signal LOCK is inverted to the low logic level (L) in any one of the drive ICs DIC1 to DIC4 in an unexpected situation during the execution of the second phase Phase-II and the third phase Phase-III, the timing controller TCON executes the first phase Phase-I and then sends the clock training pattern signal C/T to the drive ICs DIC1 to DIC4 even if the Phase-II or the Phase-III is being executed. In this case, the control data CTRL and the pixel data DATA are not received by the drive ICs DIC1 to DIC4.

Figure 25:
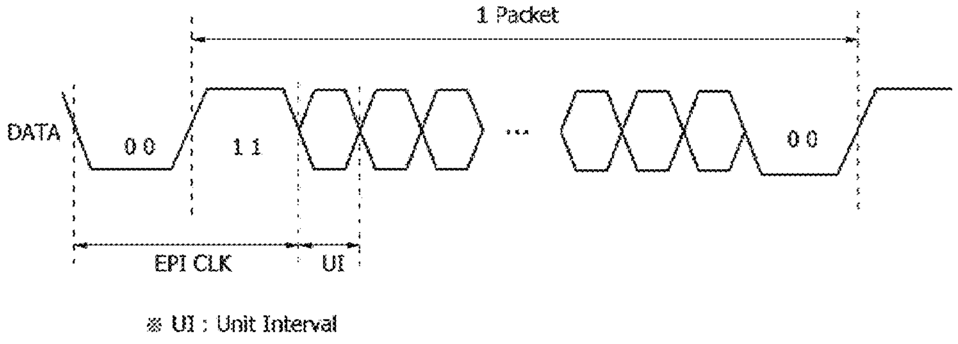
FIG. 25 is a diagram illustrating an example of one (1) data packet in the EPI interface according to one embodiment of the present disclosure.

FIG. 25 is a diagram illustrating a one (1) data packet in the EPI interface according to one embodiment of the present disclosure.

Referring to FIG. 25, one data packet of the signal DATA sent to the drive ICs DIC1 to DIC4 includes data bits, and clock bits EPI CLK allocated before and after the data bits. One-bit transfer time is one UI (Unit Interval) time. The one UI may vary depending on a resolution of the display panel 100 or the number of the data bits.

The clock bits EPI CLK are allocated by 4 UI between adjacent data packets, and their logical value may be set to, but is not limited to, "0 0 1 1 (or L L H H)". When the number of bits per color in 4 sub-color data is 10 bits, a data packet of one pixel data may include 40 UI data bits and 4 UI clock bits. When the number of the data bits is 8 bits and the pixel data includes R, G, and B data without white data W, one data packet may include 24 UI data bits including 8 bits of R sub-pixel data, 8 bits of G sub-pixel data, and 8 bits of B sub-pixel data, and 4 UI clock bits.

Figure 26:
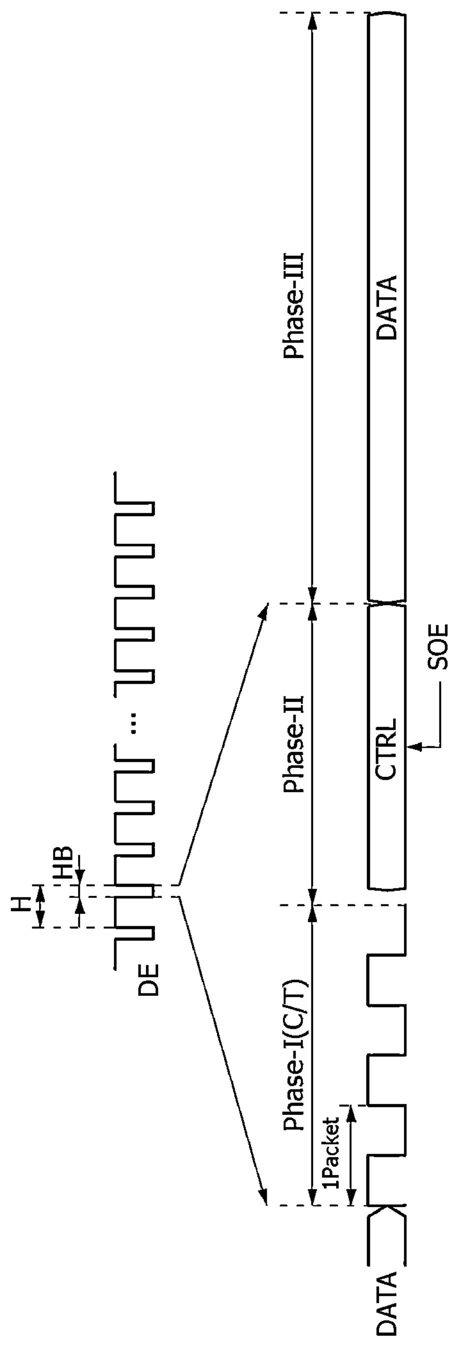
FIG. 26 is a diagram illustrating an example of a signal transmitted during a horizontal blank period according to one embodiment of the present disclosure.

FIG. 26 is a diagram illustrating an example of a signal transmitted during a horizontal blank period according to one embodiment of the present disclosure.

Referring to FIG. 26, one horizontal period (1H) may be divided into a horizontal blank period HB during which there is no pixel data, and a horizontal active interval HA during which the pixel data DATA is transmitted. The control data packets may be transmitted to the drive ICs DIC1 to DIC4 in the horizontal blank period HB.

The first phase Phase-I and the second phase Phase-II may be performed during the horizontal blank period HB. The horizontal blank period HB corresponds to the interval of the low logic level of the data enable signal DE. During the horizontal blank period HB, one or more control data packets CTRL may be transmitted. As shown in FIGS. 24 and 26, data including pulse information of the output enable signal SOE may be encoded in the control data packet CTRL. The data including pulse information of the output enable signal SOE includes data indicative of the pulse rising and falling timing of the output enable signal SOE.

The drive ICs DIC1 to DIC4 may generate the output enable signal SOE based on the pulse information of the output enable signal SOE received every horizontal period, and output the data voltage Vdata in the second logic voltage interval of the output enable signal SOE. Accordingly, the timing controller 130 may generate the pulse information of the output enable signal SOE to control the output timing of each of the drive ICs DIC1 to DIC4 every horizontal period.

Figure 27:
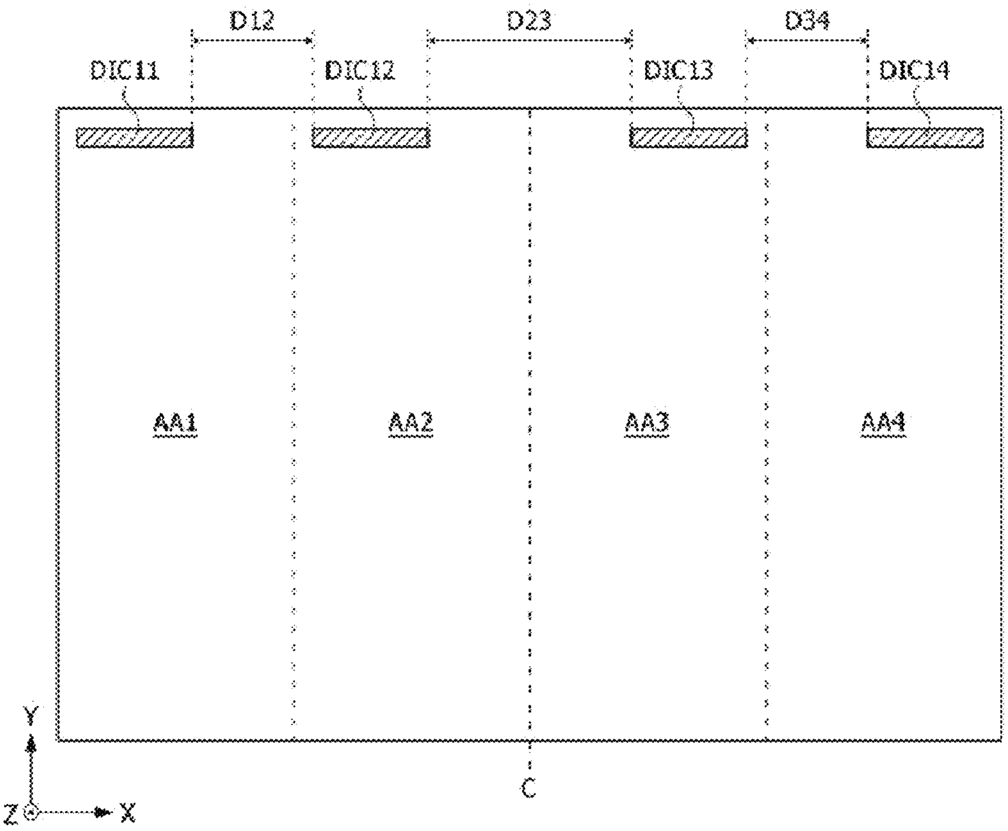
FIG. 27 is a diagram illustrating an example of a plurality of drive ICs connected to data lines of a display panel in a display device according to another embodiment of the present disclosure according to one embodiment of the present disclosure.
Figure 28:
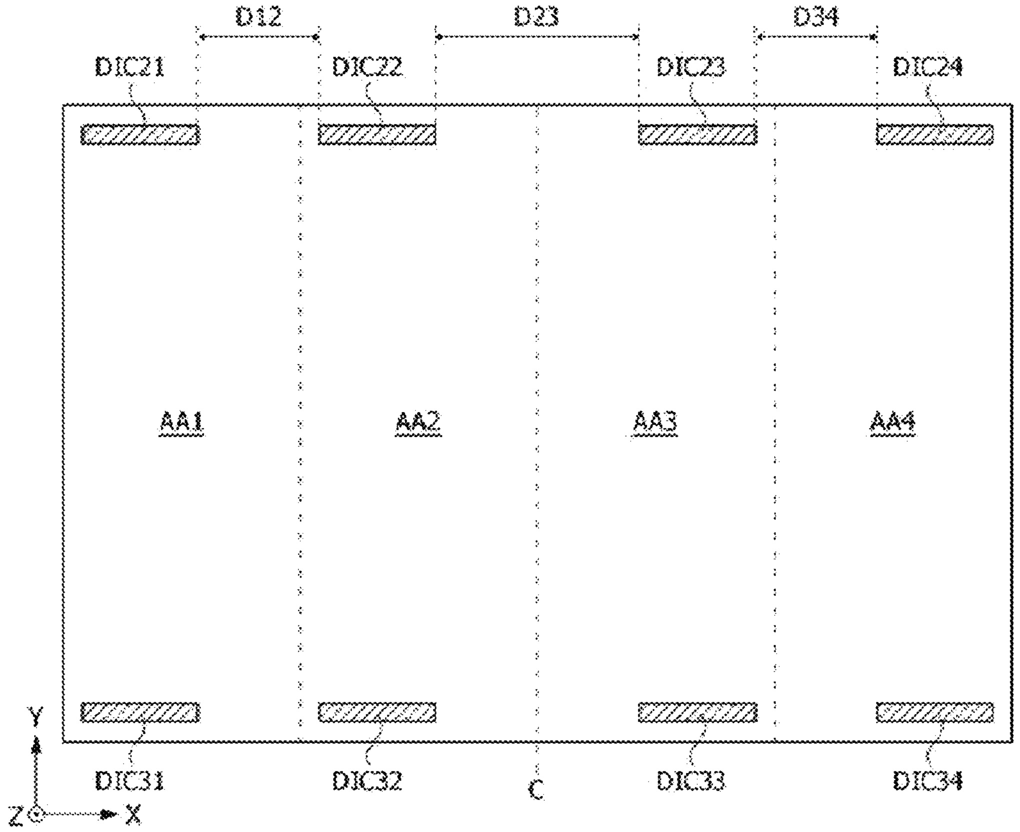
FIG. 28 is a diagram illustrating an example of a plurality of drive ICs connected to data lines of a display panel in a display device according to another embodiment of the present disclosure.

FIG. 27 is a diagram illustrating an example of a plurality of drive ICs connected to the data lines of the display panel in the display device according to another embodiment of the present disclosure. FIG. 28 is a diagram illustrating an example of a plurality of drive ICs connected to the data lines of the display panel in the display device according to another embodiment of the present disclosure.

Referring to FIG. 27, a first to fourth drive ICs DIC11 to DIC14 may be disposed at the top or bottom of the display panel 100.

When viewed from the first direction X, relative to the center C of the display panel 100, the first and second drive ICs DIC11 and DIC12 are disposed to be biased to the left of the display panel 100 at the top of the display panel 100. The third and fourth drive ICs DIC13 and DIC14 are disposed to be biased to the right of the display panel 100 at the top of the display panel 100. The drive ICs DIC11 to DIC14 are electrically connected to the data lines DL of the display panel 100 in a COG or COF structure.

When the display panel 100 is equally divided into four equal parts in the first direction X, the display panel 100 includes first and second blocks AA1 and AA2 positioned on the left side, and third and fourth blocks AA3 and AA4 positioned on the right side relative to the center C of the display panel 100.

The first drive IC DIC11 is positioned as close as possible to the left end of the display panel 100 at the top of the leftmost first block AA1 of the display panel 100. When viewed from an extension line of the first direction X connecting the center of the first drive IC DIC11 and the center of the first block AA1, the center of the first drive IC DIC11 is spaced by a predetermined distance to the left from the center of the first block AA1.

The second drive IC DIC12 is biased to the left closer to the first block AA1 at the top of the second block AA2 between the first block AA1 and the third block AA3 on the display panel 100. When viewed from an extension line of the first direction X connecting the center of the second drive IC DIC12 and the center of the second block AA2, the center of the second drive IC DIC12 is spaced by a predetermined distance to the left from the center of the second block AA2. A separation distance D12 between the first drive IC DIC11 and the second drive IC DIC12 is smaller than a separation distance D23 between the second drive IC DIC12 and the third drive IC DIC13.

The fourth drive IC DIC14 is positioned as close as possible to the right end of the display panel 100 at the top of the fourth block AA4, which is the rightmost block of the display panel 100. When viewed from an extension line of the first direction X connecting the center of the fourth drive IC DIC14 and the center of the fourth block AA4, the center of the fourth drive IC DIC14 is spaced by a predetermined distance to the right from the center of the fourth block AA4.

The third drive IC DIC13 is biased to the right closer to the fourth block AA4 at the top of the third block AA3 between the second block AA2 and the fourth block AA4 on the display panel 100. When viewed from an extension line of the first direction X connecting the center of the third drive IC DIC13 and the center of the third block AA3, the center of the third drive IC DIC13 is spaced by a predetermined distance to the right from the center of the third block AA3. A separation distance D34 between the third drive IC DIC13 and the fourth drive IC DIC14 is smaller than a separation distance D23 between the second drive IC DIC12 and the third drive IC DIC13. In FIG. 27, the separation distances D12 and D14 may be, but are not limited to, the same distance.

The first drive IC DIC11 is electrically connected to data lines disposed in the first blocks AA1 through first link lines to supply the data voltage to those data lines. The second drive IC DIC12 is electrically connected to data lines disposed in the second blocks AA2 through second link lines to supply the data voltage to those data lines. The third drive IC DIC13 is electrically connected to data lines disposed in the third block AA3 through third link lines to supply the data voltage to those data lines. The fourth drive IC DIC14 is electrically connected to data lines disposed in the fourth block AA4 through fourth link lines to supply the data voltage to those data lines.

The lengths of link lines connected to the channels of each of the first and second drive ICs DIC11 and DIC12 tend to be similar to the lengths of the left link lines shown in FIG. 10. The lengths of link lines connected to the channels of each of the third and fourth drive ICs DIC13 and DIC14 tend to be similar to the lengths of the right link lines shown in FIG. 10.

A link line connected to the center channel of each of the first and second drive ICs DIC11 and DIC12 has the lowest resistance, and a link line connected to the rightmost channel of each of the first and second drive ICs DIC11 and DIC12 has the highest resistance as the resistance of the link lines increases toward the right of each of the first and second drive ICs DIC11 and DIC12. In contrast, a line connected to the center channel of each of the third and fourth drive ICs DIC13 and DIC14 has the lowest resistance, and link lines connected to the leftmost channel of each of the third and fourth drive ICs DIC13 and DIC14 has the highest resistance as the resistance of the link lines increases toward the left of each of the third and fourth drive ICs DIC13 and DIC14.

Referring to FIG. 28, a plurality of drive ICs DIC21 to DIC24 and DIC31 to DIC34 may be disposed at the top and bottom of the display panel 100.

When viewed from the first direction X, the upper first and second drive ICs DIC21 and DIC22 are disposed to be biased to the left of the display panel 100 at the top of the display panel 100 relative to the center C of the display panel 100. The upper third and fourth drive ICs DIC23 and DIC24 are disposed to be biased to the right of the display panel 100 at the top of the display panel 100 relative to the center C of the display panel 100. The upper drive ICs DIC21 to DIC24 are electrically connected to the data lines DL of the display panel 100 in a COG or COF structure.

When viewed from the first direction X, the lower first and second drive ICs DIC31 and DIC32 are disposed to be biased to the left of the display panel 100 at the bottom of the display panel 100 relative to the center C of the display panel 100. The lower third and fourth drive ICs DIC33, DIC34 are disposed to be biased to the right of the display panel 100 at the bottom of the display panel 100. The lower drive ICs DIC31 to DIC34 are electrically connected to the data lines DL of the display panel 100 in a COG or COF structure.

When the display panel 100 is equally divided into four equal parts in the first direction X, the display panel 100 includes first and second blocks AA1 and AA2 positioned on the left side, and third and fourth blocks AA3 and AA4 positioned on the right side relative to the center C of the display panel 100.

The upper first drive IC DIC21 is positioned as close as possible to the left end of the display panel 100 at the top of the leftmost first block AA1 of the display panel 100. When viewed from an extension line of the first direction X connecting the center of the upper first drive IC DIC21 and the center of the first block AA1, the center of the upper first drive IC DIC21 is spaced by a predetermined distance to the left from the center of the first block AA1.

The lower first drive IC DIC31 is positioned as close as possible to the left end of the display panel 100 at the bottom of the first block AA1. When viewed from an extension line of the first direction X connecting the center of the lower first drive IC DIC21 and the center of the first block AA1, the center of the lower first drive IC DIC31 is spaced by a predetermined distance to the left from the center of the first block AA1.

The upper second drive IC DIC22 is biased to the left closer to the first block AA1 at the top of the second block AA2 between the first block AA1 and the third block AA3 on the display panel 100. When viewed from an extension line of the first direction X connecting the center of the upper second drive IC DIC22 and the center of the second block AA2, the center of the upper second drive IC DIC22 is spaced by a predetermined distance to the left from the center of the second block AA2. A separation distance D21 between the upper first drive IC DIC21 and the upper second drive IC DIC22 is smaller than a separation distance D23 between the upper second drive IC DIC22 and the upper third drive IC DIC23.

The lower second drive IC DIC32 is biased to the left closer to the first block AA1 at the bottom of the second block AA2. When viewed from an extension line of the first direction X connecting the center of the lower second drive IC DIC32 and the center of the second block AA2, the center of the lower second drive IC DIC22 is spaced a predetermined distance to the left from the center of the second block AA2. A separation distance between the lower first drive IC DIC31 and the lower second drive IC DIC32 is smaller than a separation distance between the lower second drive IC DIC32 and the lower third drive IC DIC33.

The upper fourth drive IC DIC24 is positioned as close as possible to the right end of the display panel 100 at the top of the fourth block AA4, which is the rightmost block of the display panel 100. When viewed from an extension line of the first direction X connecting the center of the upper fourth drive IC DIC24 and the center of the fourth block AA4, the center of the upper fourth drive IC DIC24 is spaced by a predetermined distance to the right from the center of the fourth block AA4.

The upper third drive IC DIC23 is biased to the right closer to the fourth block AA4 at the top of the third block AA3. When viewed from an extension line of the first direction X connecting the center of the upper third drive IC DIC23 and the center of the third block AA3, the center of the upper third drive IC DIC23 is spaced by a predetermined distance to the right from the center of the third block AA3. A separation distance D34 between the upper third drive IC DIC23 and the upper fourth drive IC DIC24 is smaller than a separation distance D23 between the upper second drive IC DIC22 and the upper third drive IC DIC23. In FIG. 28, the separation distances D12 and D14 may be, but are not limited to, the same distance.

The lower fourth drive IC DIC34 is positioned as close as possible to the right end of the display panel 100 at the bottom of the fourth block AA4. When viewed from an extension line of the first direction X connecting the center of the lower fourth drive IC DIC34 and the center of the fourth block AA4, the center of the lower fourth drive IC DIC34 is spaced by a predetermined distance to the right from the center of the fourth block AA4.

The lower third drive IC DIC33 is biased to the right closer to the fourth block AA4 at the bottom of the third block AA3. When viewed from an extension line of the first direction X connecting the center of the lower third drive IC DIC33 and the center of the third block AA3, the center of the lower third drive IC DIC33 is spaced by a predetermined distance to the right from the center of the third block AA3. A separation distance between the lower third drive IC DIC33 and the lower fourth drive IC DIC34 is smaller than a separation distance between the lower second drive IC DIC32 and the lower third drive IC DIC33.

Figure 29:
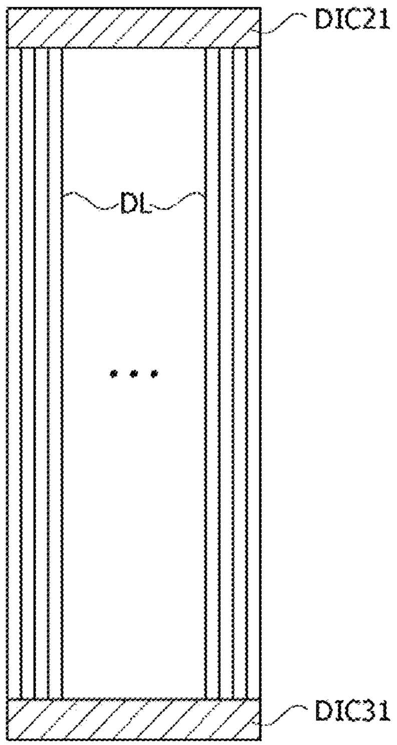
FIGS. 29 and 30 are diagrams illustrating data signals connected to the drive ICs shown in FIG. 28 according to one embodiment of the present disclosure.
Figure 30:
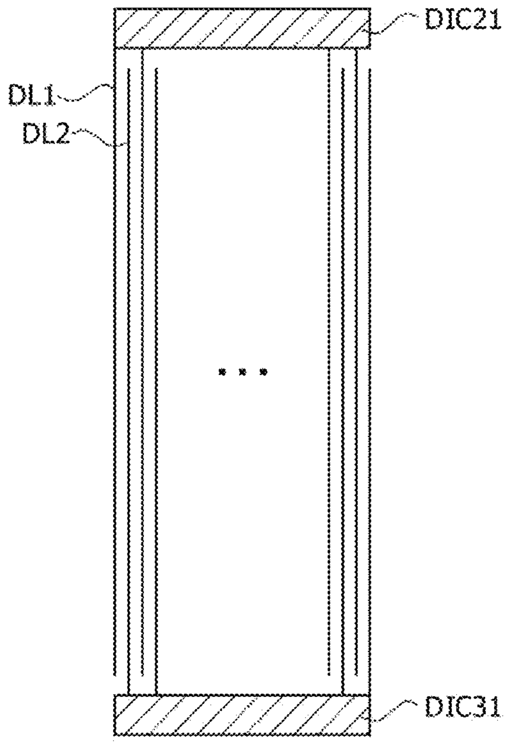

The upper drive ICs DIC21 to DIC24 and the lower drive ICs DIC31 to DIC34 may be connected to the data lines DL in the connection structure shown in FIGS. 29 and 30.

Referring to FIGS. 28 and 29, the top of each of the data lines DL may be connected to the output terminals of the upper drive ICs DIC21 to DIC24 through the top link lines, and the bottom of each of the data lines DL may be connected to the output terminals of the lower drive ICs DIC31 to DIC34 through the bottom link lines. In this case, the upper drive ICs DIC21 to DIC24 and the lower drive ICs DIC31 to DIC34 may simultaneously supply data voltage Vdata to both ends of the data lines DL in a double feeding method.

Referring to FIGS. 28 and 30, the top of each of the odd-numbered data lines DL1 may be connected to the output terminals of the upper drive ICs DIC21 to DIC24 through the upper link lines, and the bottom of each of the even-numbered data lines DL2 may be connected to the output terminals of the lower drive ICs DIC31 to DIC34 through the lower link lines. In this case, the data voltage Vdata output from the drive ICs DIC21 to DIC24 and DIC31 to DIC34 is applied to one of the two ends of the data lines DL in a single feeding method.

Due to the arrangement of the drive ICs D12 to D14 shown in FIGS. 27 and 28, the scan signal SCAN is also delayed at the pixel location at which the data voltage Vdata is delayed. Accordingly, the margin times MG1 and MG2 shown in FIG. 8 may be reduced.

The methods of controlling the phases of the clock and the output enable signal that are used in the other embodiments described above may also be applied to the display devices shown in FIGS. 27 and 28.

According to one or more embodiments of the present disclosure, the display device may be applied to mobile devices, video phones, smart watches, watch phones, wearable device, foldable device, rollable device, bendable device, flexible device, curved device, sliding device, variable device, electronic organizer, electronic books, portable multimedia players (PMPs), personal digital assistants (PDAs), MP3 players, mobile medical devices, desktop PCs, laptop PCs, netbook computers, workstations, navigations, vehicle navigations, vehicle display devices, vehicle devices, theater devices, theater display devices, televisions, wallpaper devices, signage devices, game devices, laptops, monitors, cameras, camcorders, and home appliances, etc. Additionally, the display apparatus according to one or more embodiments of the present disclosure may be applied to organic light emitting lighting devices or inorganic light emitting lighting devices.

The objects to be achieved by the present disclosure, the means for achieving the objects, and effects of the present disclosure described above do not specify essential features of the claims, and thus, the scope of the claims is not limited to the disclosure of the present disclosure.

Although the embodiments of the present disclosure have been described in more detail with reference to the accompanying drawings, the present disclosure is not limited thereto and may be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure.

What is claimed is:

1. A display device comprising:

a display panel including a plurality of gate lines disposed along a first direction, a plurality of data lines disposed along a second direction, and a plurality of pixel circuits;

a data driver configured to supply a data voltage to the plurality of data lines; and a gate driver configured to supply a pulse of a gate signal to the plurality of gate lines, wherein the display panel is equally divided into a plurality of blocks in the first direction, the display panel includes at least a first block, a second block, a third block, and a fourth block, wherein the data driver includes:

a first drive integrated circuit (IC) biased to a left end of the display panel within the first block of the display panel; and a second drive IC biased to a right end of the display panel within a fourth block of the display panel.

2. The display device of claim 1, wherein the first drive IC is connected to data lines from the plurality of data lines in the first block and the second block through a plurality of link lines, and the second drive IC is connected to data lines from the plurality of data lines in the third block and the fourth block through a plurality of other link lines.

3. The display device of claim 2, wherein a length of a link line connected to a right channel that is spaced from a center of the first drive IC is longer than a length of a link line connected to a center channel of the first drive IC, a length of a link line connected to a rightmost channel of the first drive IC is longer than a length of a link line connected to a leftmost channel of the first drive IC, a length of a link line connected to a left channel that spaced from a center of the second drive IC is longer than a length of a link line connected to a center channel of the second drive IC, and a length of a link line connected to a leftmost channel of the second drive IC is longer than a length of a link line connected to a rightmost channel of the second drive IC.

4. The display device of claim 2, wherein, when viewed from the first direction, a resistance of the plurality of link lines increases as the plurality of link lines are from both edges of the display panel toward a center of the display panel.

5. The display device of claim 1, further comprising:

a level shifter configured to supply a clock to the gate driver; and a plurality of clock wires disposed along the second direction of the display panel, the plurality of clock wires connected to the gate driver.

6. The display device of claim 5, wherein, compared to a phase of the clock input to the gate driver at a first position of a clock wire from the plurality of clock wires that is located at a first distance from a clock input port to which the clock is applied, a phase of the clock input to the gate driver at a second position of a clock wire from the plurality of clock wires located at a second distance from the clock input port is shifted further forward, and the second distance is greater than the first distance.

7. The display device of claim 6, wherein at a time when the phase of the clock is shifted forward, one period of the clock is less than one period of a previous clock.

8. The display device of claim 7, wherein the pixel circuit includes:

a transistor configured to be turned on in response to a gate-on voltage of the gate signal, and turned off in response to a gate-off voltage of the gate signal, and at the time when the phase of the clock is shifted forward, an interval of the gate-off voltage is shorter than an interval of the gate-off voltage within one period of the previous clock.

9. The display device of claim 1, wherein each of the first drive IC and the second drive IC is configured to output the data voltage in response to an output enable signal, and wherein a delay time of the output enable signal becomes longer as a distance from the first drive IC and the second drive IC increases.

10. The display device of claim 9, wherein when the delay time of the output enable signal becomes longer than before, a pulse width of the output enable signal increases.

11. A display device comprising:

a display panel including a plurality of gate lines disposed along a first direction, a plurality of data lines disposed along a second direction, and a plurality of pixel circuits;

a data driver configured to supply a data voltage to the plurality of data lines; and a gate driver configured to supply a pulse of a gate signal to the plurality of gate lines, wherein, when the display panel is equally divided into a plurality of blocks in the first direction, the display panel includes at least a first block, a second block, a third block, and a fourth block, wherein the data driver includes:

a first drive integrated circuit (IC) biased to a left end of the display panel within the first block of the display panel;

a second drive IC biased to a left of the display panel within the second block of the display panel;

a third drive IC biased to a right of the display panel within the third block of the display panel; and a fourth drive IC biased toward a right end of the display panel within the fourth block of the display panel.

12. The display device of claim 11, wherein the first drive IC is connected to data lines from the plurality of data lines disposed in the first block through a plurality of link lines, the second drive IC is connected to data lines from the plurality of data lines disposed in the second block through a plurality of second link lines, the third drive IC is connected to data lines from the plurality of data lines disposed in the third block through a plurality of third link lines, and the fourth drive IC is connected to data lines from the plurality of data lines disposed in the fourth block through a plurality of fourth link lines.

13. The display device of claim 12, wherein a length of a link line connected to a right channel that is spaced from a center of each of the first drive IC and the second drive IC is longer than a length of a link line connected to a center channel of each of the first drive IC and the second drive IC, a length of a link line connected to a rightmost channel of each of the first drive IC and the second drive IC is longer than a length of a link line connected to a leftmost channel of each of the first drive IC and the second drive IC, a length of a link line connected to a left channel that spaced from a center of each of the third drive IC and the fourth drive IC is longer than a length of a link line connected to a center channel of each of the third drive IC and the fourth drive IC, and a length of a link line connected to a leftmost channel of each of the third drive IC and the fourth drive IC is longer than a length of a link line connected to a rightmost channel of each of the third drive IC and the fourth drive IC.

14. The display device of claim 11, further comprising:

a level shifter configured to supply a clock to the gate driver; and a plurality of clock wires disposed along the second direction of the display panel, the plurality of clock wires connected to the gate driver.

15. The display device of claim 14, wherein, compared to a phase of the clock input to the gate driver at a first position of a clock wire located at a first distance from a clock input port to which the clock is applied, a phase of the clock input to the gate driver at a second position of a clock wire located at a second distance from the clock input port is shifted further forward, and the second distance is greater than the first distance.

16. The display device of claim 15, wherein at a time when the phase of the clock is shifted forward, one period of the clock is less than one period of a previous clock.

17. The display device of claim 16, further comprising a pixel circuit including:

a transistor configured to be turned on in response to a gate-on voltage of the gate signal, and turned off in response to a gate-off voltage of the gate signal, and at the time when the phase of the clock is shifted forward, an interval of the gate-off voltage is shorter than an interval of the gate-off voltage within one period of the previous clock.

18. The display device of claim 11, wherein each of the first drive IC and the second drive IC is configured to output the data voltage in response to an output enable signal, and wherein a delay time of the output enable signal becomes longer as a distance from the first drive IC and the second drive IC increases.

19. The display device of claim 18, wherein when the delay time of the output enable signal becomes longer than before, a pulse width of the output enable signal increases.

* * * * *